(12) United States Patent
Hasuda et al.

(10) Patent No.: US 8,430,582 B2
(45) Date of Patent: Apr. 30, 2013

(54) CAMERA ACCESSORY, MOUNT OF CAMERA ACCESSORY, CAMERA BODY AND MOUNT OF CAMERA BODY

(75) Inventors: Masanori Hasuda, Fujisawa (JP); Noriyasu Kotani, Tokyo (JP); Hideaki Hoshikawa, Koshigaya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/029,621

(22) Filed: Feb. 17, 2011

(65) Prior Publication Data
US 2012/0057860 A1 Mar. 8, 2012

(30) Foreign Application Priority Data
Sep. 6, 2010 (JP) ................... 2010-198864

(51) Int. Cl.
*G03B 17/00* (2006.01)
(52) U.S. Cl.
USPC ............................................................ 396/531
(58) Field of Classification Search ............. 396/531
See application file for complete search history.

(56) References Cited

U.S. PATENT DOCUMENTS

| 4,307,954 | A | * | 12/1981 | Ludwig | ............ | 396/531 |
| 5,946,516 | A | * | 8/1999 | Yoshida et al. | ............ | 396/529 |
| 6,351,612 | B1 | | 2/2002 | Misawa | | |
| 2005/0031338 | A1 | * | 2/2005 | Koyama et al. | ............ | 396/531 |
| 2010/0046102 | A1 | | 2/2010 | Ho | | |
| 2012/0201532 | A1 | | 8/2012 | Hasuda et al. | | |

FOREIGN PATENT DOCUMENTS

| JP | A-05-127242 | 5/1993 |
| JP | A-2005-70712 | 3/2005 |
| JP | A-2008-015267 | 1/2008 |
| JP | A-2010-250149 | 11/2010 |

OTHER PUBLICATIONS

Feb. 15, 2013 Office Action issued in U.S. Appl. No. 13/225,919.

\* cited by examiner

*Primary Examiner* — Rodney Fuller
(74) *Attorney, Agent, or Firm* — Oliff & Berridge, PLC

(57) ABSTRACT

A camera accessory is equipped with an accessory mount assuming a bayonet structure with first through third tabs set over intervals along a circumference and projecting from inside of the accessory toward the outside. The mount is structured so that insertion of the mount is allowed when the mount is inserted at a correct interlock phase without any of the first through third tabs contacting any of three camera body-side tabs, and that insertion of the mount is disallowed if the accessory mount is positioned at an incorrect interlock phase with at least two tabs contacting at least two of the camera body-side tabs. The first through the third tabs extend along varying lengths along the circumference. When the first tab and either other tab contacts two of the camera body-side tabs at a total of two contact locations, the first tab contacts near the second side end.

22 Claims, 22 Drawing Sheets

FRONT ←——→ REAR

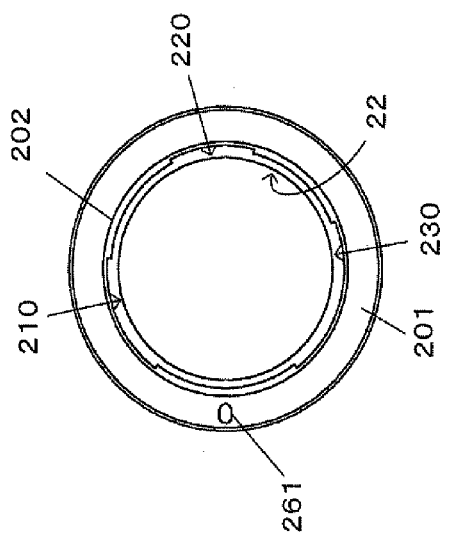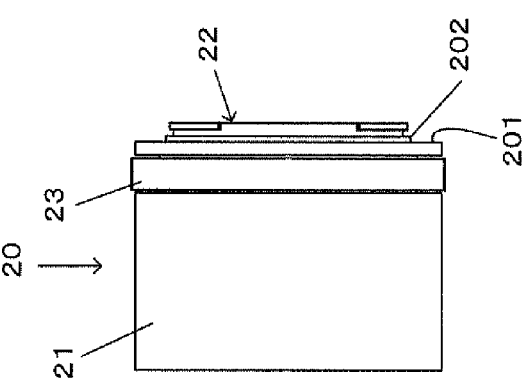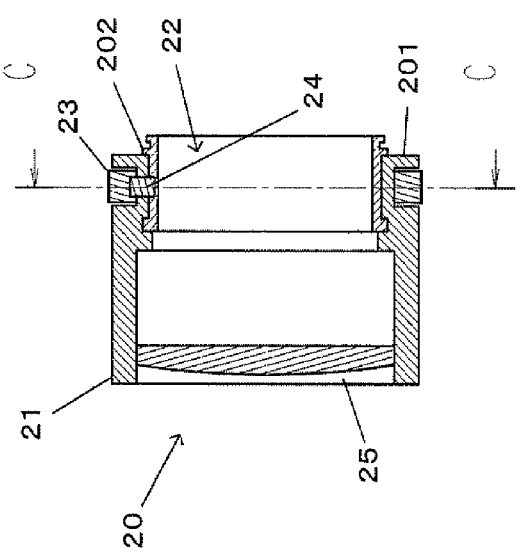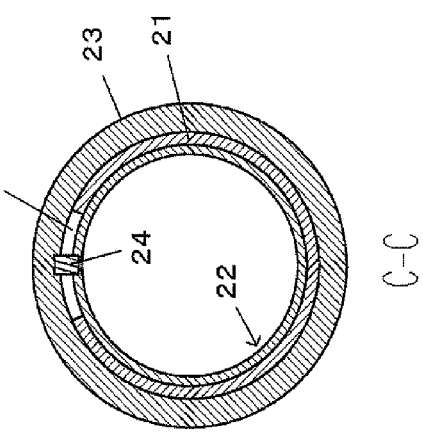

CAMERA ACCESSORY, MOUNT OF CAMERA ACCESSORY, CAMERA BODY AND MOUNT OF CAMERA BODY

INCORPORATION BY REFERENCE

The disclosure of the following priority application is herein Incorporated by reference:

Japanese Patent Application No. 2010-198864 filed Sep. 6, 2010

BACKGROUND OF THE INVENTION

1. Field of the Invention

The present invention relates to an accessory mount and a body mount adopting a bayonet structure, via which a camera accessory and a camera body can be detachably engaged with each other, and a camera accessory and a camera body with the mounts installed.

2. Description of Related Art

A camera accessory, such as an exchangeable lens, and a camera body assuming structures that allow them to be detachably engaged with each other via a mount system adopting a bayonet structure are known in the related art. Such a camera accessory and the camera body are allowed to engage with each other only if the camera accessory mount is inserted through the camera body mount at the correct interlock phase. If, however, the user attempts to insert the camera accessory mount through the camera body mount at a phase other than the correct interlock phase, at least one of the three tabs at the camera accessory mount will contact one of the three tabs at the camera body mount and thus, the camera accessory and the camera body will not be able to engage with each other (see Japanese Laid Open Patent Publication No. 2005-70712).

SUMMARY OF THE INVENTION

When only one of the tabs at the mount of the camera accessory, i.e., an exchangeable lens (hereafter referred to as a photographic lens), comes into contact with one of the tabs at the camera body mount in the mount system described in the patent reference mentioned above, the other two tabs on the photographic lens side may be positioned between the tabs on the camera body-side. If the user then attempts to turn the photographic lens into the camera body in order to engage the photographic lens with the camera body in this state, the photographic lens mount may be allowed to rotate relative to the camera body and thus become cross-threaded in the camera body mount. In these circumstances, the lens may become engaged with an inclination at an angle with respect to the camera body.

A camera accessory of the first aspect according to the present invention, that can be detachably engaged with a camera body, is equipped with an accessory mount assuming a bayonet structure with a first tab, a second tab and a third tab set over intervals along a circumferential direction and projecting from an inner side of the accessory toward an outer side. The camera accessory mount is structured so that insertion of the accessory mount through a camera body mount disposed at the camera body is allowed as long as the accessory mount is inserted at a correct interlock phase relative to the camera body mount without any of the first tab, the second tab and the third tab coming into contact with any of three camera body-side tabs at the camera body mount, and that insertion of the accessory mount through the camera body mount is disallowed if the accessory mount is positioned at a phase other than the correct interlock phase with at least two tabs among the first tab, the second tab and the third tab coming into contact with at least two of the camera body-side tabs. The first tab, the second tab and the third tab extend along varying lengths along the circumferential direction. The first tab extends over a greatest length along the circumferential, direction. The first tab, the second tab and the third tab include first side ends, which are leading ends of the first tab, the second tab and the third tab rotated in a mounting direction along the circumferential direction to engage the accessory mount inserted at the correct interlock phase with the camera body mount, and second side ends located on a side opposite from the first side ends. When the first tab and either the second or third tab comes into contact with two of the camera body-side tabs at a total of two contact locations, contact achieved by the first tab is located near the second side end thereof.

A camera accessory of the second aspect according to the present invention, that can be detachably engaged with a camera body, is equipped with an accessory mount assuming a bayonet structure with a first tab, a second tab and a third tab set over intervals along a circumferential direction and projecting from an inner side of the accessory circumference toward an outer side, The camera mount is structured so that insertion of the accessory mount through a camera body mount disposed at the camera body is allowed as long as the accessory mount is inserted at a correct interlock phase relative to the camera body mount without any of the first tab, the second tab and the third tab coming into contact with any of three camera body-side tabs at the camera body mount, and that insertion of the accessory mount through the camera body mount is disallowed if the accessory mount is positioned at a phase other than the correct interlock phase with at least two tabs among the first tab, the second tab and the third tab coming into contact with at least two of the camera body-side tabs. The first tab at the accessory mount having been inserted at the correct interlock phase and engaged with the camera body mount overlaps a camera body-side tab assuming an uppermost position when the camera body is set with a longitudinal orientation achieved by rotating the upright camera body assuming a lateral orientation by approximately 90°. The first tab, the second tab and the third tab include first side ends, which are leading ends of the first tab, the second tab and the third tab rotated in a mounting direction along the circumferential direction to engage the accessory mount inserted at the correct interlock phase with the camera body mount, and second side ends located on a side opposite from the first side ends. When the first tab and either the second or third tab comes into contact with two of the camera body-side tabs at a total of two contact locations, contact achieved by the first tab is located near the second side end thereof.

An accessory mount of the third aspect according to the present invention is disposed at a camera accessory of the first and second aspects.

A camera body of the fourth aspect according to the present invention, with which a camera accessory can be detachably engaged, is equipped with a body mount adopting a bayonet structure with a first tab, a second tab and a third tab disposed over intervals along a circumferential edge of a circular opening at the camera body and projecting from an outer side of the opening toward an inner side. The body mount is structured so that insertion of an accessory mount disposed at the camera accessory is allowed as long as the accessory mount is inserted at a correct interlock phase without any of the first tab, the second tab and the third tab coming into contact with any of three accessory-side tabs at the accessory mount, and insertion of the accessory mount is disallowed at a phase other than the correct interlock phase as at least two tabs among the first tab, the second tab and the third tab come into contact with at least two of the accessory-side tabs. The first tab assumes an uppermost position when the camera body is set upright in a lateral orientation. The first tab, the second tab and the third tab include first side ends, which are leading ends in a mounting direction in which the accessory-side tabs are rotated along the circumference of the opening in order to engage the accessory-side mount inserted at the correct interlock phase with the body mount and second side ends, located on a side opposite from the first side ends. When the first tab and either the second or third tab come into contact with two of the accessory-side tabs at a total of two contact locations, a contact area at the first tab includes an area near the first side end thereof.

A body mount of the fifth aspect according to the present invention is disposed at the camera body of the third and fourth aspects.

A camera accessory mount the sixth aspect according to the present invention is disposed at a camera accessory of the first or second aspect.

BRIEF DESCRIPTION OF THE DRAWINGS

FIGS. 22A-22D present an example of a variation.

DESCRIPTION OF PREFERRED EMBODIMENTS

Figure 1:
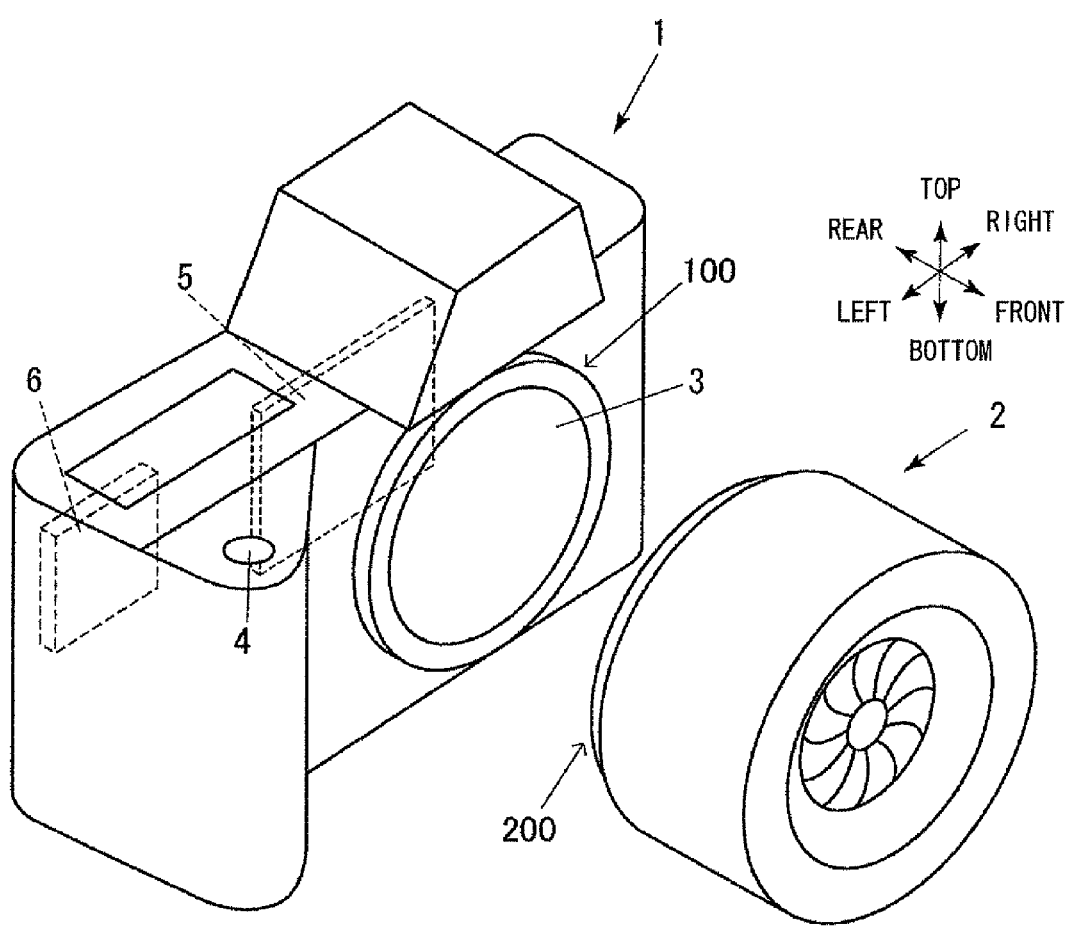
FIG. 1 is a perspective schematically illustrating a camera body 1 compatible with exchangeable lenses and a photographic lens 2 that can be detachably mounted at the camera body 1, in conjunction with which the present invention may be adopted.

In reference to FIGS. 1 through 19, the camera accessory, the camera accessory mount, the camera body and the body mount achieved in an embodiment of the present invention are described. FIG. 1 is a schematic perspective of a camera body 1 compatible with exchangeable lenses and an exchangeable lens (hereafter referred to as a photographic lens 2) that may be detachably mounted at the camera body 1, in conjunction with which the present invention is adopted. A shutter release button 4, an image sensor 5 and a control circuit 6 that controls various units of the camera body 1 are disposed at the camera body 1. Reference numeral 3 indicates a photographic optical path through which a subject image departing the photographic lens 2 is guided to the image sensor 5.

A body mount 100 assuming a bayonet structure is disposed on the front side of the camera body 1. A camera accessory, e.g., the photographic lens 2 or a converter lens used to adjust the focal length, is mounted at the body mount 100. On the rear side of the photographic lens 2, a lens mount, i.e., an accessory mount 200, via which the photographic lens 2 can be detachably mounted at the body mount 100, is disposed.

FIG. 1 does not include detailed illustrations of the structures adopted in the body mount 100 and the camera accessory mount 200.

A top-bottom direction, a left-right direction and a front-rear direction are defined as indicated in FIG. 1 for the camera body 1. FIG. 1 shows that the top-bottom direction relative to the camera body 1 matches the vertical direction.

The attitude of the camera 1 shown in FIG. 1 is referred to as an upright attitude or a lateral orientation. The attitude of the camera body 1 assumed by rotating the camera body with the lateral orientation by 90 degrees clockwise or counterclockwise viewed from the front side is referred to as a longitudinal orientation.

—Body Mount 100—

Figure 2:
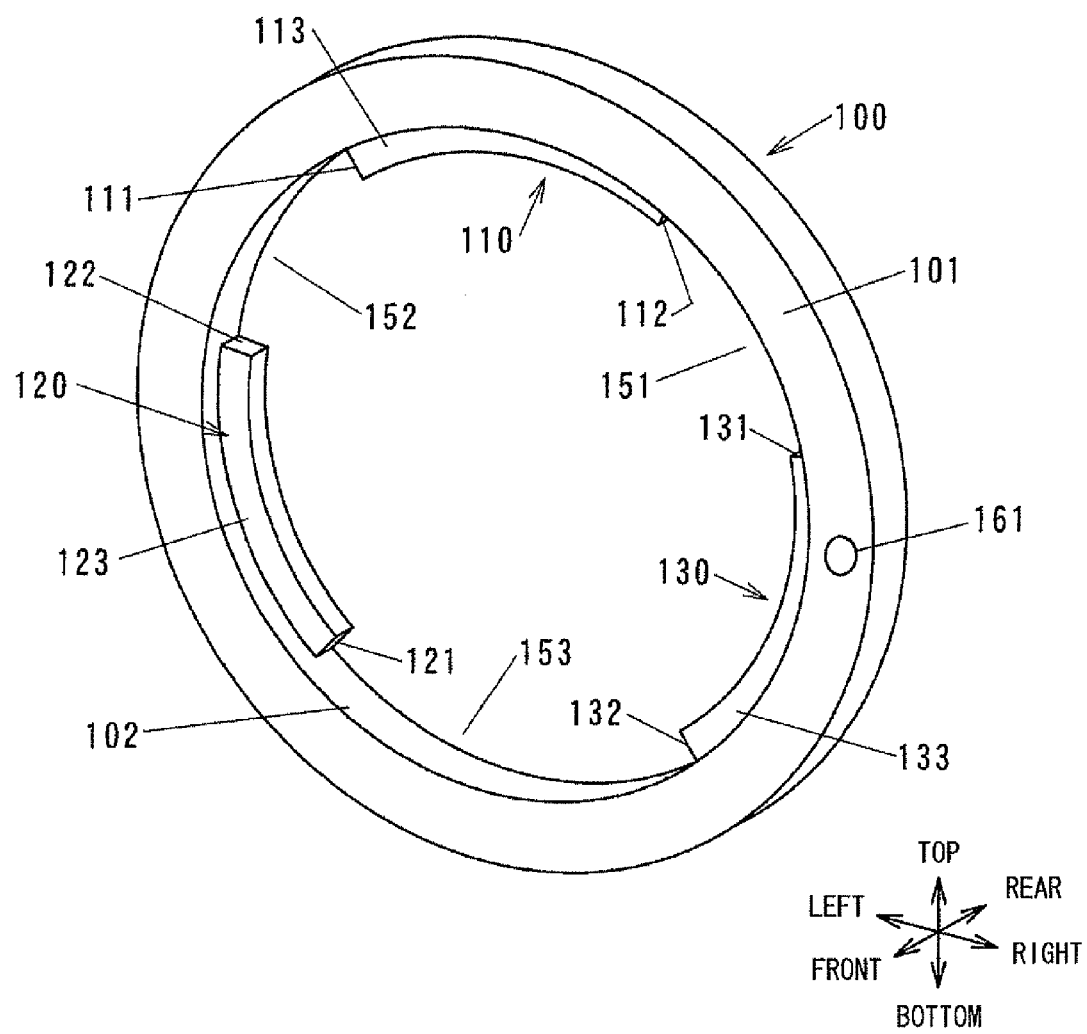
FIG. 2 is a perspective schematically illustrating the structure of the body mount 100, viewed along a diagonal direction from a front right viewpoint relative to the camera body 1.

FIG. 2 is a perspective of the body mount 100 taken along a diagonal direction from a front right viewpoint relative to the camera body 1. FIG. 2 schematically illustrates the structure of the body mount 100. The body mount 100 adopts a bayonet structure that includes three tabs (body-side tabs) set apart from one another along the circumferential edge of a circular opening (photographic optical path) at the camera body 1, each projecting inward from the outer side of the opening circumference. Among the three body-side tabs, the body-side tab located at the uppermost position is referred to as a body-side first tab 110, the body-side tab located next to the body-side first tab 110 along the counterclockwise direction in the figure is referred to as a body-side second tab 120 and the body-side tab located next to the body-side second tab 120 along the counterclockwise direction is referred to as a body-side third tab 130.

The space created between two consecutive body-side tabs is referred to as a body-side gap. As explained later, body-side gaps are used as spaces through which the tabs (accessory-side tabs at the accessory mount 200 pass when the photographic lens 2 is mounted or dismounted. The body-side gap between the body-side third tab 130 and the body-side first tab 110 is referred to as a body-side first gap 151, the body-side gap located next to the body-side first gap 151 along the counterclockwise direction in the figure is referred to as a body-side second gap 152 and the body-side gap located next to the body-side second gap along the counterclockwise direction is referred to as a body-side third gap 153.

The surface of the body-side first tab 110 facing toward the front side of the camera is referred to as a first tab front surface 113, the side end of the body-side first tab 110 facing the body-side second gap 152 is referred to as a first tab first side end 111, and the side end of the body-side first tab 110 facing the body-side first gap 151 on the clockwise side relative to the body-side first gap 151 in the figure is referred to as a first tab second side end 112. Likewise, the surface of the body-side second tab 120 facing toward the front side of the camera is referred to as a second tab front surface 123, the side end of the body-side second tab 120 facing the body-side third gap 153 is referred to as a second tab second side end 121 and the side end of the body-side second tab 120 facing the body-side second gap 152 is referred to as a second tab second side end 122. The surface of the body-side third tab 130 facing toward the front side of the camera is referred to as a third tab front surface 133, the side end of the body-side third tab 130 facing the body-side first gap 151 is referred to as a third tab first side end 131, and the side end of the body-side third tab 130 facing the body-side third gap 153 is referred to as a third tab second side end 132.

The first side ends 111, 121 and 131 at the body-side first through third tabs are tab ends formed toward the direction in which the lens mount is mounted (mounting direction), whereas the second side ends 112, 122 and 132 at the body-side first through third tabs are tab ends formed toward the direction in which the lens mount is dismounted (dismounting direction).

The rear surface of the body-side first tab 110 in FIG. 2 is referred to as a body-side first tab rear surface. In the subsequent description, the body-side first tab rear surface will be referred to in conjunction with reference numeral 114. Likewise, the rear surface of the body-side second tab 120 and the rear surface of the body-side third tab 130 are respectively referred to a body-side second tab rear surface and a body-side third tab rear surface, which will be respectively referred to in conjunction with reference numerals 124 and 134.

A body mount reference surface 101 is a ring-shaped flat surface formed so as to face toward the front side. As the photographic lens 2 is mounted at the camera body 1, the body mount reference surface 101 comes into contact with an accessory-side mount reference surface 201 of the accessory mount 200, which is to be described in detail later, thereby limiting the position assumed by the photographic lens 2 along the front-rear direction.

A fitting portion 202 of the accessory mount 200, to be detailed later, fits at an inner cylindrical circumferential surface 102 of the cylindrical body mount 100. The circumferential surface 102 is used as a reference surface, in reference to which the optical axis of the photographic lens 2 is aligned with the optical axis of the camera body 1 (the central axis of a photographic optical path 3).

A pin (not shown) projects out or retracts through a pin hole 161 formed at the body mount reference surface 101. The pin projecting out through the pin hole 161 disallows rotation of the mounted photographic lens 2 relative to the camera body 1, i.e., the body mount 100 locks the photographic lens 2 in place.

—Accessory Mount 200—

Figure 3:
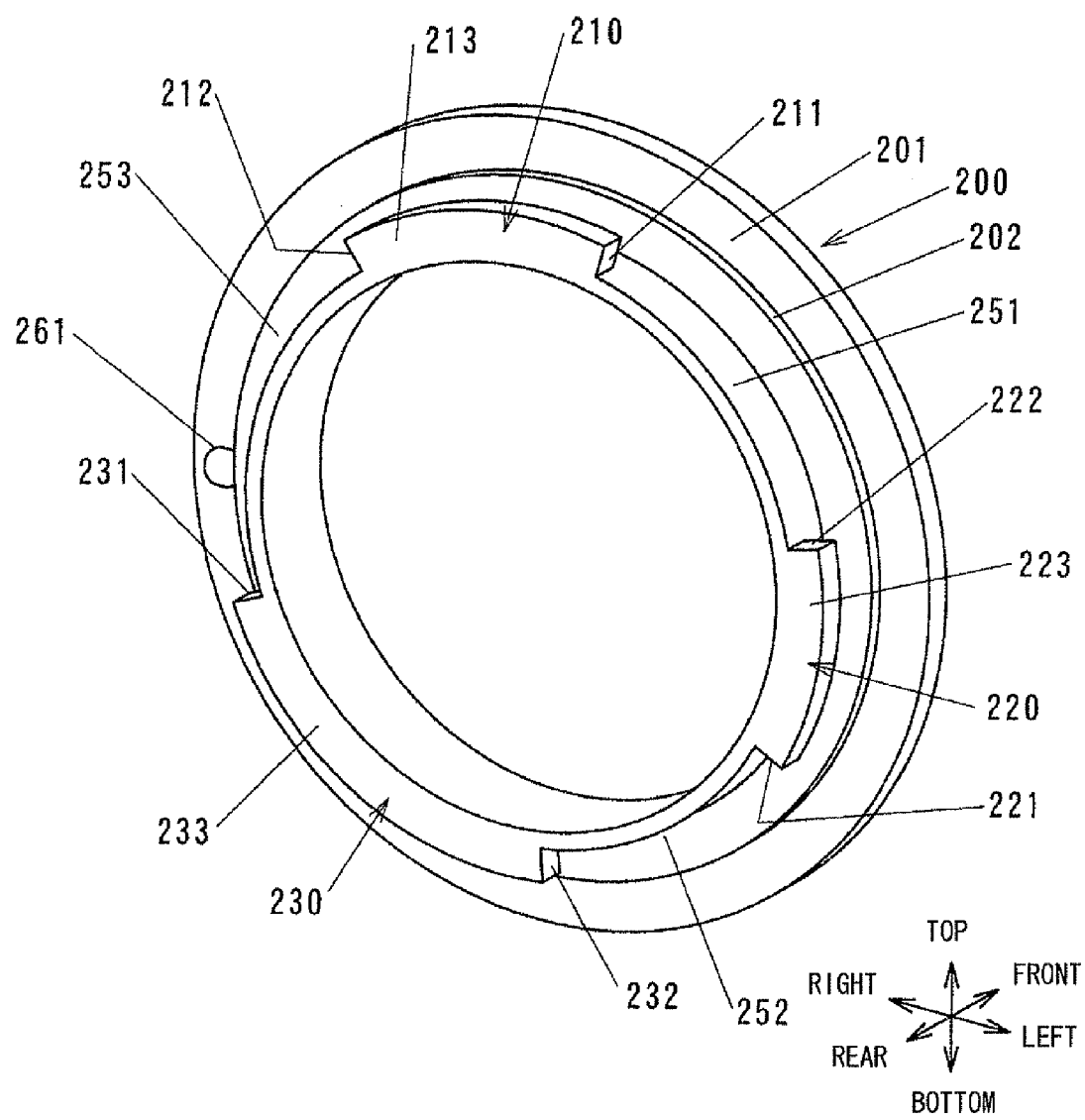
FIG. 3 is a perspective schematically illustrating the structure of the accessory mount 200, viewed along a diagonal direction from a rear left viewpoint relative to the photographic lens 2.

FIG. 3 is a perspective schematically illustrating the structure of the accessory mount 200 viewed along a diagonal direction from a rear left viewpoint relative to the photographic lens 2, FIG. 3 shows the accessory mount 200 with the photographic lens 2 fully mounted at the camera body 1 (mounting complete state), i.e., in a photographing-enabled state. This means that the top-bottom and left-right direction of the accessory mount 200 shown in FIG. 3 matches the top-bottom, left-right direction of the camera body 1. Unless specifically noted, the following description is given by assuming that the top-bottom, left-right direction of the accessory mount 200 is the direction in the mounting complete state.

The accessory mount 200 adopts a bayonet structure that includes three tabs (accessory-side tabs) set apart from one another along the circumferential direction, each projecting toward the outer circumference of the mount. Among the three accessory-side tabs, the accessory-side tab located at the uppermost position is referred to as an accessory-side first tab 210, the accessory-side tab located next to the accessory-side first tab 210 along the clockwise direction in the figure is referred to as an accessory-side second tab 220 and the accessory-side tab located next to the accessory-side second tab 220 along the clockwise direction is referred to as an accessory-side third tab 230.

The space created between two consecutive accessory-side tabs is referred to as an accessory-side gap. As explained later, accessory-side gaps are used as spaces through which the body-side tabs pass when the photographic lens 2 is mounted or dismounted. The accessory-side gap between the accessory-side first tab 210 and the accessory-side second tab 220 is referred to as an accessory-side first gap 251, the accessory-side gap located next to the accessory-side first gap 251 along the clockwise direction in the figure is referred to as an accessory-side second gap 252 and the accessory-side gap located next to the accessory-side second gap along the clockwise direction is referred to as an accessory-side third gap 253.

The surface of the accessory-side first tab 210 facing toward the rear side of the camera is referred to as a first tab rear surface 213, the side end of the accessory-side first tab 210 facing the accessory-side first gap 251 is referred to as a first tab first side end 211 and the side end of the accessory-side first tab 210 facing the accessory-side third gap 253 is referred to as a first tab second side end 212. Likewise, the surface of the accessory-side second tab 220 facing toward the rear side of the camera is referred to as a second tab rear surface 223, the side end of the accessory-side second tab 220 facing the accessory-side second gap 252 is referred to as a second tab first side end 221, and the side end of the accessory-side second tab 220 facing the accessory-side first gap 251 is referred to as a second tab second side end 222. The surface of the accessory-side third tab 230 facing toward the rear side of the camera is referred to as a third tab rear surface 233, the side end of the accessory-side third tab 230 facing the accessory-side third gap 253 is referred to as a third tab first side end 231 and the side end of the accessory-side third tab 230 facing the accessory-side second gap 252 is referred to as a third tab second side end 232.

The first side ends 211, 221 and 231 at the accessory-side first through third tabs are tab ends formed toward the lens mount mounting direction, whereas the second side ends 212, 222 and 232 at the accessory-side first through third tabs are tab ends formed toward the lens mount dismounting direction.

The rear surface of the accessory-side first tab 210 in FIG. 3 is referred to as a accessory-side first tab front surface. In the subsequent description, the accessory-side first tab front surface will be referred to in conjunction with reference numeral 214 (not shown in FIG. 3). Likewise, the rear surface of the accessory-side second tab 220 and the rear surface of the accessory-side third tab 230 in FIG. 3 are respectively referred to as an accessory-side third tab front surface and a accessory-side third tab front surface, which will be respectively referred to in conjunction with reference numerals 224 and 234 (not shown in FIG. 3).

The accessory mount reference surface 201 is a ring-shaped flat surface formed so as to face toward the rear side, and comes in contact with the body mount reference surface 101 when the photographic lens 2 is fully mounted at the camera body 1.

The fitting portion 202 is a cylindrical portion that fits at the inner circumferential surface 102 of the body mount 100 and is used for reference when aligning the optical axis of the photographic lens 2 with the optical axis of the camera body 1 (the central axis of the photographic optical path 3) as explained earlier.

As the pin (not shown), which projects out or retracts through the pin hole 161 at the body mount 100, as described above, is inserted through a pin hole 261, rotation of the fully mounted photographic lens 2 relative to the camera body 1 (body mount 100) becomes disallowed and the photographic lens 2 thus becomes locked.

Figure 4:
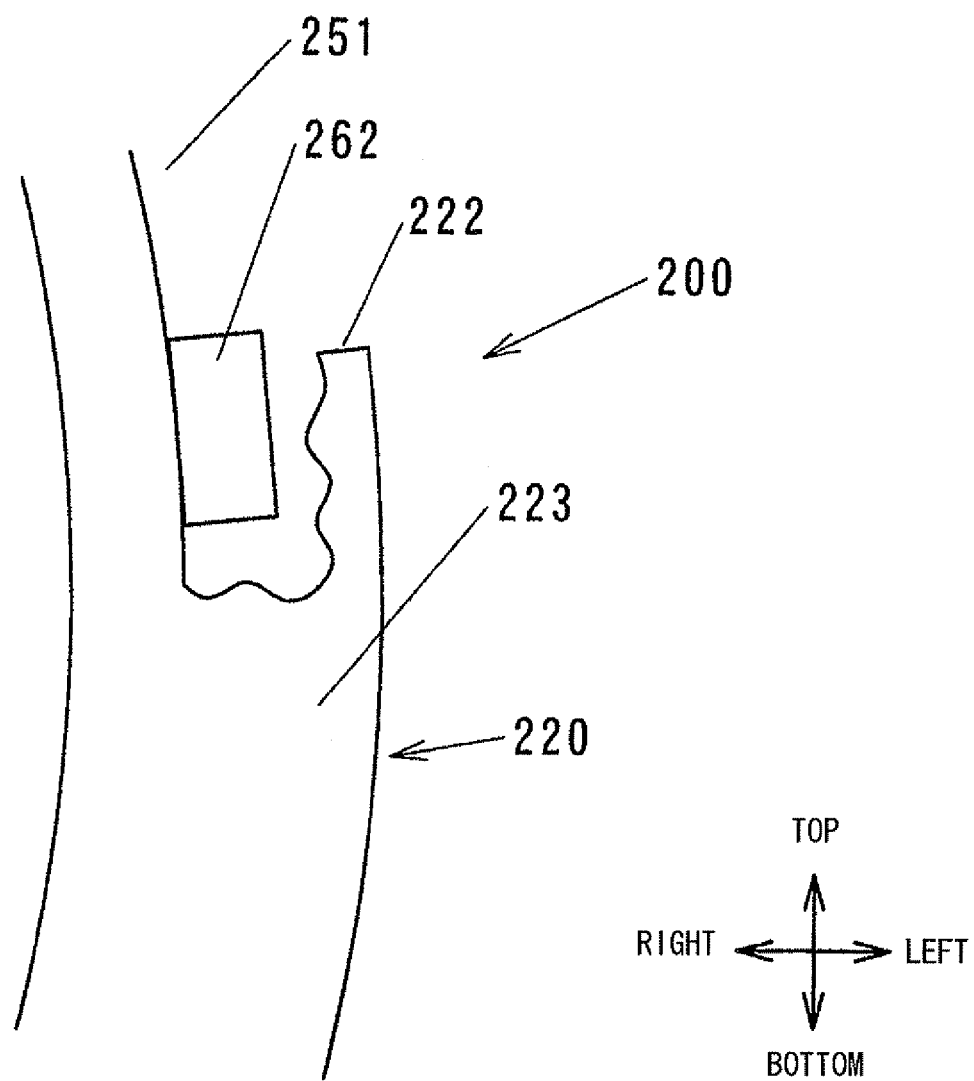
FIG. 4 indicates the position at which a restricting member 262 is disposed.

Although not shown in FIG. 3, a restricting member 262, which limits the rotation range of the photographic lens 2 (accessory mount 200) relative to the camera body 1 (body mount 100) while the photographic lens 2 is mounted or dismounted, is disposed frontward relative to the accessory-side second tab 220 near its second side end 222, as shown in FIG. 4. The restriction of the rotation range achieved via the restricting member 262 will be described in detail later. The restricting member 262 may be, for instance, a headed pin screwed in from the outer side of the accessory mount 200 along the radial direction.

—Positions of Body-Side Tabs and Body-Side Gaps—

Figure 5:
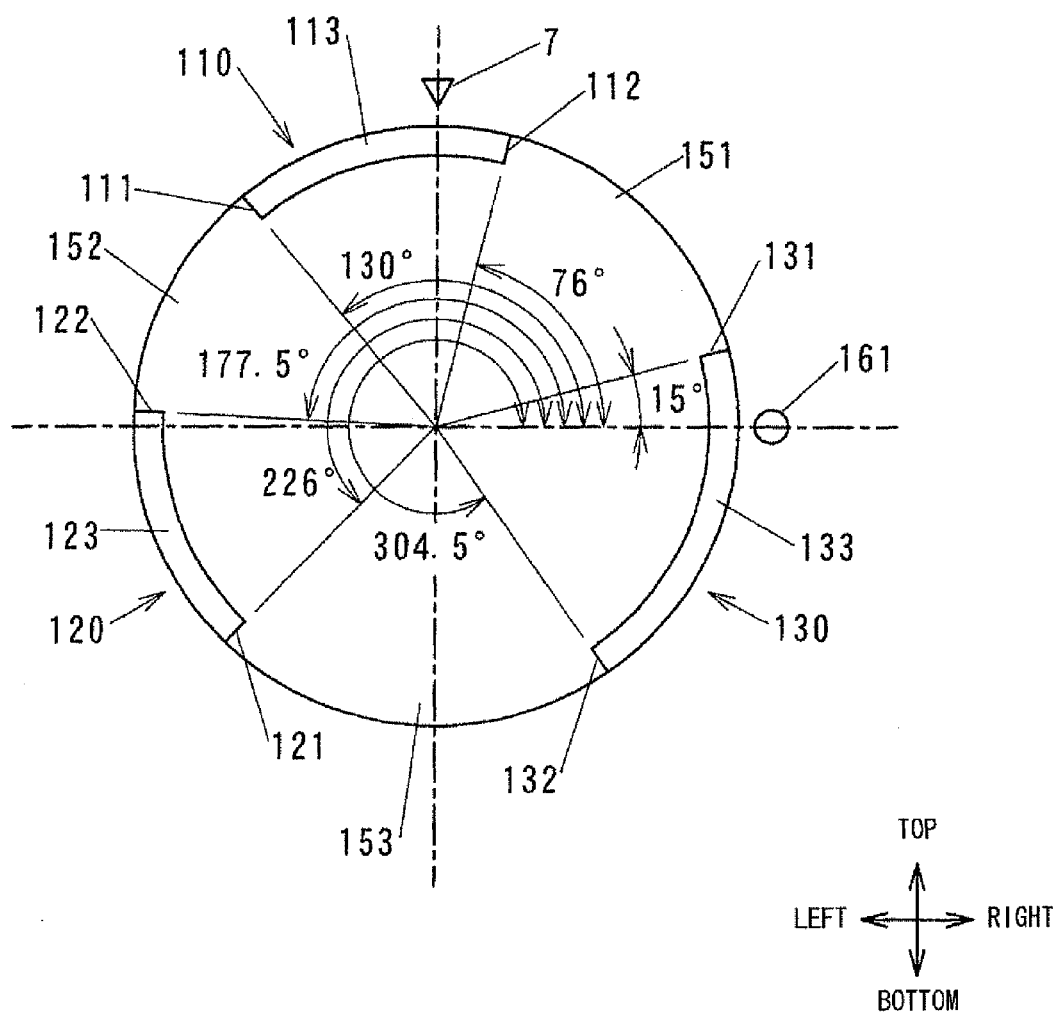
FIG. 5 indicates the positions of the body-side tabs and the body-side gaps at the body mount 100 viewed from the front side of the camera body 1.

FIG. 5 indicates the positions of the body-side tabs and the body-side gaps at the body mount 100 viewed from the front side of the camera body 1. In reference to FIG. 5, the positions assumed by the body-side tabs are described. In the following description, the reference 0° angular position is taken along the three o'clock direction in FIG. 5 and various angles are assumed along the counterclockwise direction relative to the 0° reference point.

The body-side first tab 110 extends over an angular range of 76° to 130°. The body-side second tab 120 extends over an angular range of 177.5° to 226°. The body-side third tab 130 extends over an angular range of 304.5° to 15° (375° range).

The sizes of the individual body-side tabs 110 to 130 can each be indicated by the corresponding angular range along the circumferential edge of the circular opening at the body mount 100. Namely, the body-side first tab 110 has a 54° angular range, the body-side second tab 120 has a 48.5° angular range and the body-side third tab 130 has a 70.5° angular range. Likewise, the sizes of the individual body-side gaps 151 to 153 can each be indicated by the corresponding angular range along the circumferential edge of the circular opening at the body mount 100. Namely, the body-side first gap 151 has a 61° angular range, the body-side second gap 152 has a 47.5° angular range and the body-side third gap 153 has a 78.5° angular range.

An index mark 7 at the camera body 1 shown in FIG. 5 is used as a reference mark when mounting the photographic lens 2 at the camera body 1. In the angular coordinate system defined for the tabs and gaps, the index mark 7 assumes a 90° angular position.

—Positions of Accessory-Side Tabs and Accessory-Side Gaps—

Figure 6:
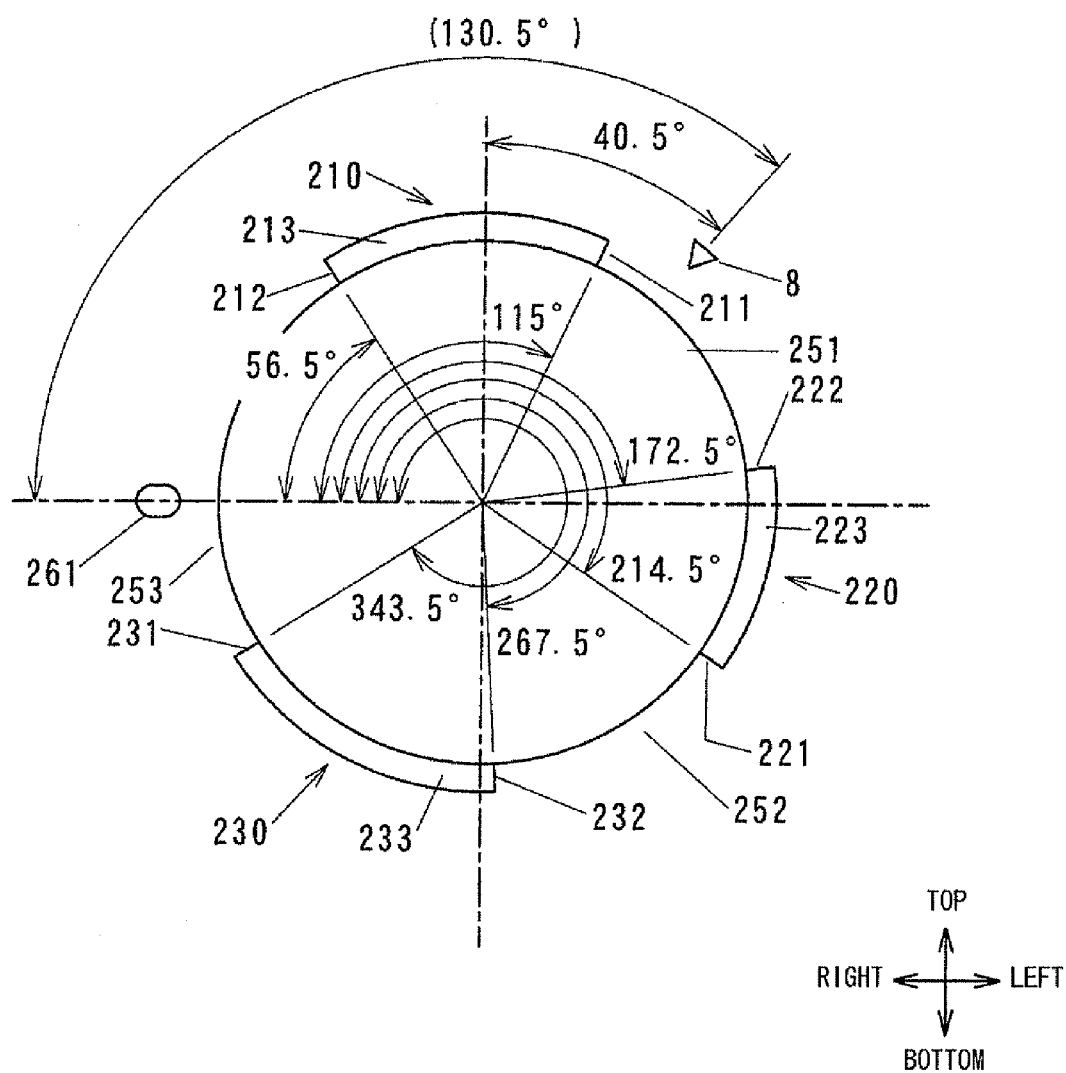
FIG. 6 indicates the positions of the accessory-side tabs and the accessory-side gaps at the accessory mount 200 viewed from the rear side of the photographic lens 2.

FIG. 6 indicates the positions of the accessory-side tabs and the accessory-side gaps at the accessory mount 200 viewed from the rear side of the photographic lens 2. In reference to FIG. 6, the positions assumed by the accessory-side tabs are described. In the following description, the reference 0° angular position is taken along the nine o'clock direction in FIG. 6 and various angles are assumed along the clockwise direction relative to the 0° reference point.

The accessory-side first tab 210 extends over an angular range of 56.5° to 115°. The accessory-side second tab 220 extends over an angular range of 172.5° to 214.5°. The accessory-side third tab 230 extends over an angular range of 267.5° to 343.5°.

The ranges over which the accessory-side tabs 210 to 230 extend along the circumference of the accessory mount 200 can each be indicated by the corresponding angular range along the circumference of the accessory mount 200. Namely, the accessory-side first tab 210 has a 58.5° angular range, the accessory-side second tab 220 has a 42° angular range and the accessory-side third tab 230 has a 76° angular range. Likewise, the sizes of the individual accessory-side gaps 251 to 253 can each be indicated by the corresponding angular range along the circumference of the accessory mount 200. Namely, the accessory-side first gap 251 has a 57.5° angular range, the accessory-side second gap 252 has a 53° angular range and the accessory-side third gap 253 has a 73° angular range.

An index mark 8 at the photographic lens 2 shown in FIG. 6 is used as a reference mark when mounting the photographic lens 2 at the camera body 1. In the angular coordinate system defined for the tabs and gaps, the index mark 8 assumes a 130.5° angular position. This angle is equal to a value representing the sum of 90° and a mounting angle of 40.5° to be described in detail later.

As explained earlier, the restricting member 262 is disposed frontward relative to the accessory-side second tab 220 near its second side end 222. This means that the restricting member 262 is disposed near the accessory-side second tab 220 extending over the shortest range along the circumference of the accessory mount 200 (with the smallest angular range along the circumference of the accessory mount 200).

—Mounting Procedure Through which the Photographic Lens 2 is Mounted at the Camera Body 1—

The photographic lens 2 is mounted at the camera body 1 through the following procedure. It is to be noted that the rotational position assumed by the photographic lens 2 relative to the camera body 1 when the axis extending along the front-rear direction through the center of the photographic optical path 3 of the camera body 1 and the optical axis of the photographic lens 2 are aligned with each other is to be hereafter referred to simply as an interlock phase.

Figure 7:
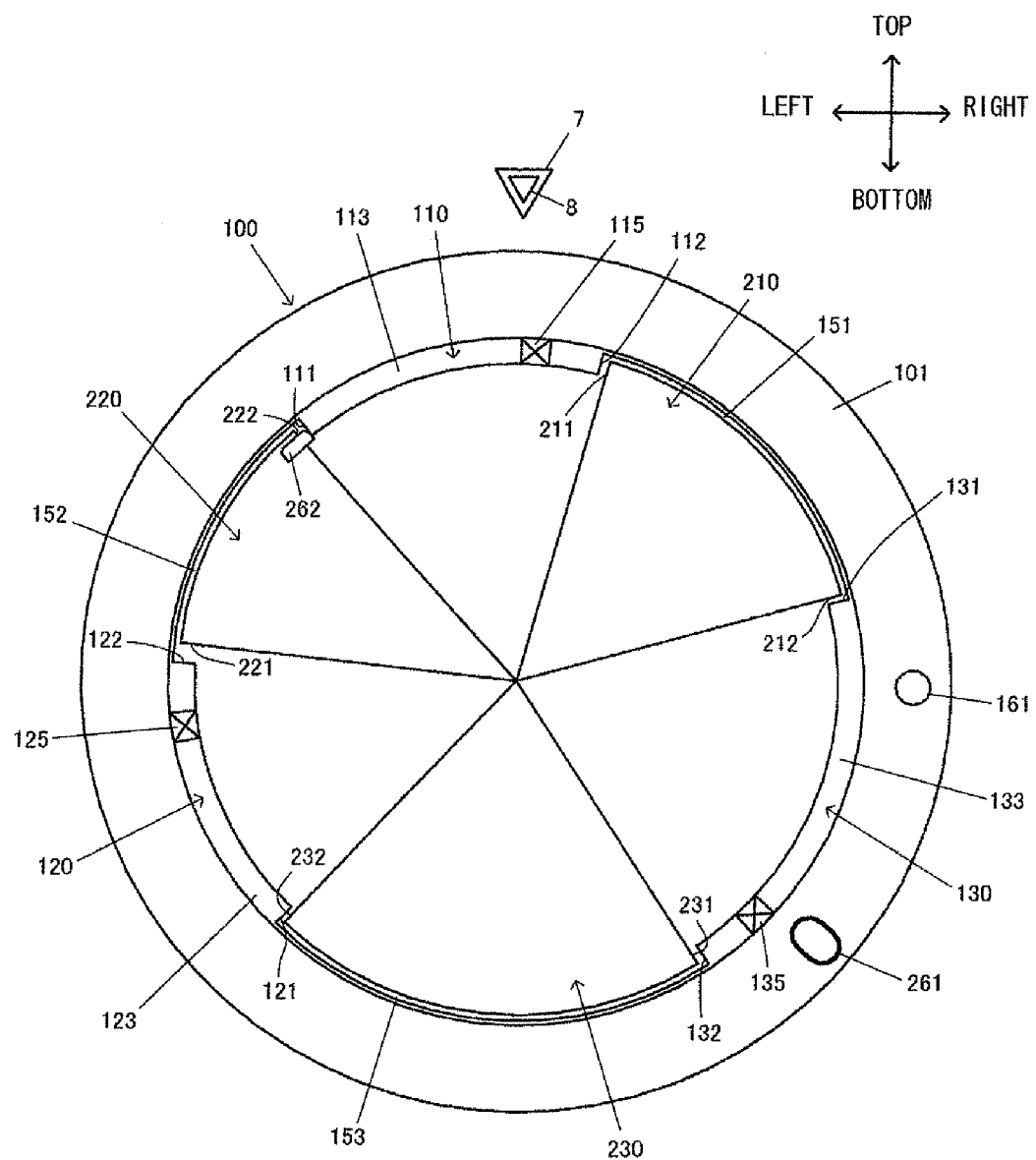
FIG. 7 shows a specific state of interference (state of overlap) between the body-side tabs 110 to 130 and the accessory-side tabs 210 to 230.

While sustaining the alignment of the axis extending along the front-rear direction through the center of the photographic optical path 3 at the camera body 1 and the optical axis of the photographic lens 2, the photographic lens 2 is mounted at the camera body 1 by aligning the rotational position of the index mark 8 at the photographic lens 2 with the rotational position of the index mark 7 at the camera body 1. When the two index marks 7 an 8 are aligned, the photographic lens 2 and the camera body 1 achieve a positional relation relative to each other in which the body-side tabs 110 to 130 and the accessory-side tabs 210 to 230 do not interfere with each other, as shown in FIG. 7, and the accessory mount 200 can be thus inserted through the body mount 100 until the accessory-side mount reference surface 201 contacts the body mount reference surface 101. The interlock phase assumed in this state is to be referred to as a correct interlock phase.

It is to be noted that in FIG. 7, showing a specific state of interference (state of overlap) between the body-side tabs 110 to 130 and the accessory-side tabs 210 to 230, the accessory-side tabs are shown as fan-shaped members in a schematic representation.

As the accessory mount 200 is inserted at the body mount 100 at the correct interlock phase, the accessory-side first tab 210 passes from front to back through the body-side first gap 151, the accessory-side second tab 220 passes from front to back through the body-side second gap 152 and the accessory-side third tab 230 passes from front to back through the body-side third gap 153. Likewise, the body-side first tab 110 passes from back to front through the accessory-side first gap 251 (no reference numeral appended in FIG. 7), the body-side second tab 120 passes from back to front through the accessory-side second gap 252 (no reference numeral appended in FIG. 7) and the body-side third tab 130 passes from back to front through the accessory-side third gap 253 (no reference numeral appended in FIG. 7).

As the photographic lens 2 is turned along the counterclockwise direction viewed from the front side of the camera body 1 after the accessory mount 200 is inserted through the body mount 100 at the correct interlock phase, the accessory-side first tab 210 takes up a position to the rear of the body-side first tab 110, the accessory-side second tab 220 takes up a position to the rear of the body-side second tab 120 and the accessory-side third tab 230 takes up a position to the rear of the body-side third tab 130. When the photographic lens 2 is turned by 40.5° relative to the correct interlock phase along the counterclockwise direction viewed from the front side of the camera body 1, the restricting member 262 comes in contact with the second side end 122 of the body-side second tab 120, thereby preventing further rotation of the photographic lens 2 along the counterclockwise direction. In other words, once the photographic lens 2 is turned by 40.5° along the counterclockwise direction from the correct interlock phase, the accessory mount 200 becomes engaged with the body mount 100 (engagement of the accessory-side tabs and the body-side tabs is completed) and thus, the photographic lens 2 becomes fully mounted.

The rotational angle of 40.5°, by which the photographic lens 2 is turned from the correct interlock phase to the phase at which mounting of the photographic lens 2 is completed, is to be referred to as a mounting angle. In addition, the counterclockwise turning direction mentioned above may be otherwise referred to as a mounting direction.

When the photographic lens 2 is fully mounted, the position of the pin hole 261 at the accessory mount 200 is aligned with the position of the pin hole 161 at the body mount 100. The pin (not shown) projecting out through the pin hole 161 at the body mount 100 is thus inserted through the pin hole 261.

—Procedure Through which the Photographic Lens 2 is Dismounted from the Camera Body 1—

The photographic lens 2 is dismounted from the camera body 1 through the following procedure. A button (not shown) disposed at the camera body 1 is depressed so as to retract the pin mentioned from the pin hole 261. As the photographic lens 2 is turned back to the correct interlock phase along the clockwise direction viewed from the front side of the camera body 1 in this state, the accessory-side tabs and the body-side tabs become disengaged. When the photographic lens 2 is turned to the correct interlock phase, the restricting member 262 comes in contact with the first side end 111 of the body-side first tab 120, thereby preventing further rotation of the photographic lens 2 along the clockwise direction. In other words, the state shown in FIG. 7 is resumed. Since the body-side tabs 110 to 130 and the accessory-side tabs 210 to 230 do not interfere with each other at the correct interlock position, as explained earlier, the photographic lens 2 can be pulled forward and separated from the camera body 1. It is to be noted that the clockwise turning direction mentioned above may be otherwise referred to as a dismounting direction.

—State of Engagement Between Accessory-Side Tabs and Body-Side Tabs—

Figure 9:
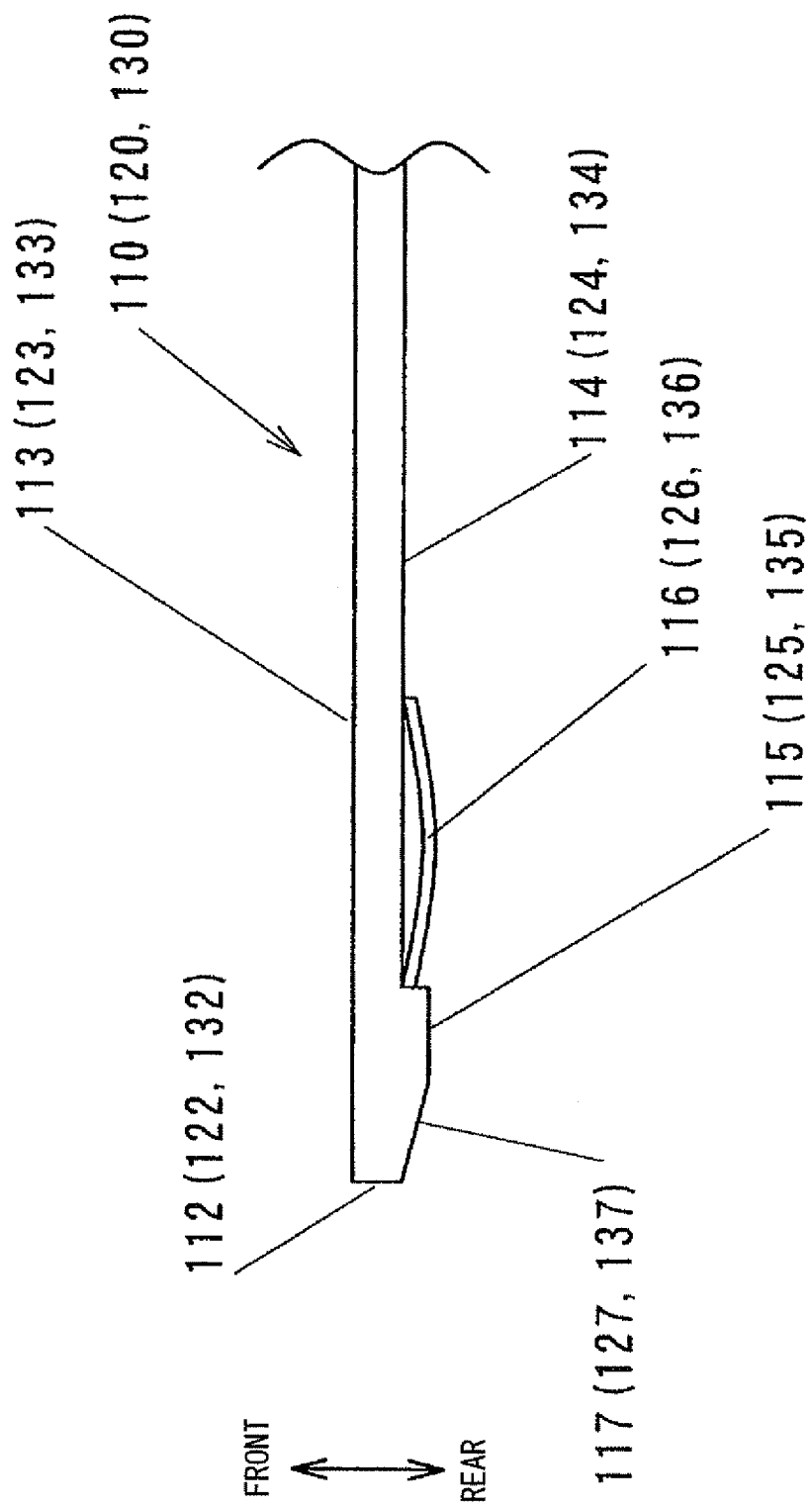
FIG. 9 schematically illustrates the body-side first tab 110 expanded along the circumference in a view taken from the outer side along the radial direction.

FIG. 9 is a schematic view of the body-side first tab 110 expanded along the circumferential direction, taken from the outer circumferential side of the photographic lens 2. The body-side first tab 110 includes a tapered surface 117 formed on the side where the rear surface 114 is located, near the second side end 112. The tapered surface 117 is formed so as to allow the accessory-side first tab 210 to smoothly move into a position to the rear of the body-side first tab 110 while the photographic lens 2 is being mounted. A contact portion 115, constituted with a surface ranging perpendicular to the direction extending from front to rear relative to the body mount 100, is formed continuous to the tapered surface 117 at the body-side first tab 110 on the side where the rear surface 114 is located near the second side end 112. At the rear surface 114, a spring 116 is disposed at a position adjacent to the contact portion 115.

The spring 116 is an elastic member that comes in contact with the front surface 214 (not shown in FIG. 9) of the accessory-side first tab 210 having moved into the position to the rear of the body-side first tab 110 and presses the front surface 214 rearward. With the spring 116, a state in which the accessory-side mount reference surface 201 and the body mount reference surface 101 remain in contact with each other at a predetermined level of elastic force is sustained.

If an external force that would cause the photographic lens 2 to tilt relative to the camera body 1 against the force applied by the spring 116 is applied to the photographic lens 2 having become fully mounted, the contact portion 115 comes in contact with the front surface 214 of the accessory-side first tab 210 to restrict any forward displacement of the accessory-side first tab 210. It is to be noted while the force applied by the spring 116 keeps the accessory-side mount reference surface 201 and the body mount reference surface 101 in contact (tight contact) with each other, the contact portion 115 is set slightly apart from the front surface 214 of the accessory-side first tab 210.

The body-side second tab 120 and the body-side third tab 130 adopt structures similar to that described above. Namely, the body-side second tab 120 includes a tapered surface 127 formed on the side where the rear surface 124 is located, near the second side end 122. A contact portion 125, constituted with a surface ranging perpendicular to the direction extending from front to rear relative to the body mount 100, is formed continuous to the tapered surface 127 at the body-side second tab 120 on the side where the rear surface 124 is located near the second side end 122. At the rear surface 124, a spring 126 is disposed at a position adjacent to the contact portion 125.

The body-side third tab 130 includes a tapered surface 137 formed on the side where the rear surface 134 is located, near the second side end 132. A contact portion 135, constituted with a surface ranging perpendicular to the direction extending from front to rear relative to the body mount 100, is formed continuous to the tapered surface 137 at the body-side third tab 130 on the side where the rear surface 134 is located near the second side end 132. At the rear surface 134, a spring 136 is disposed at a position adjacent to the contact portion 135.

Figure 8:
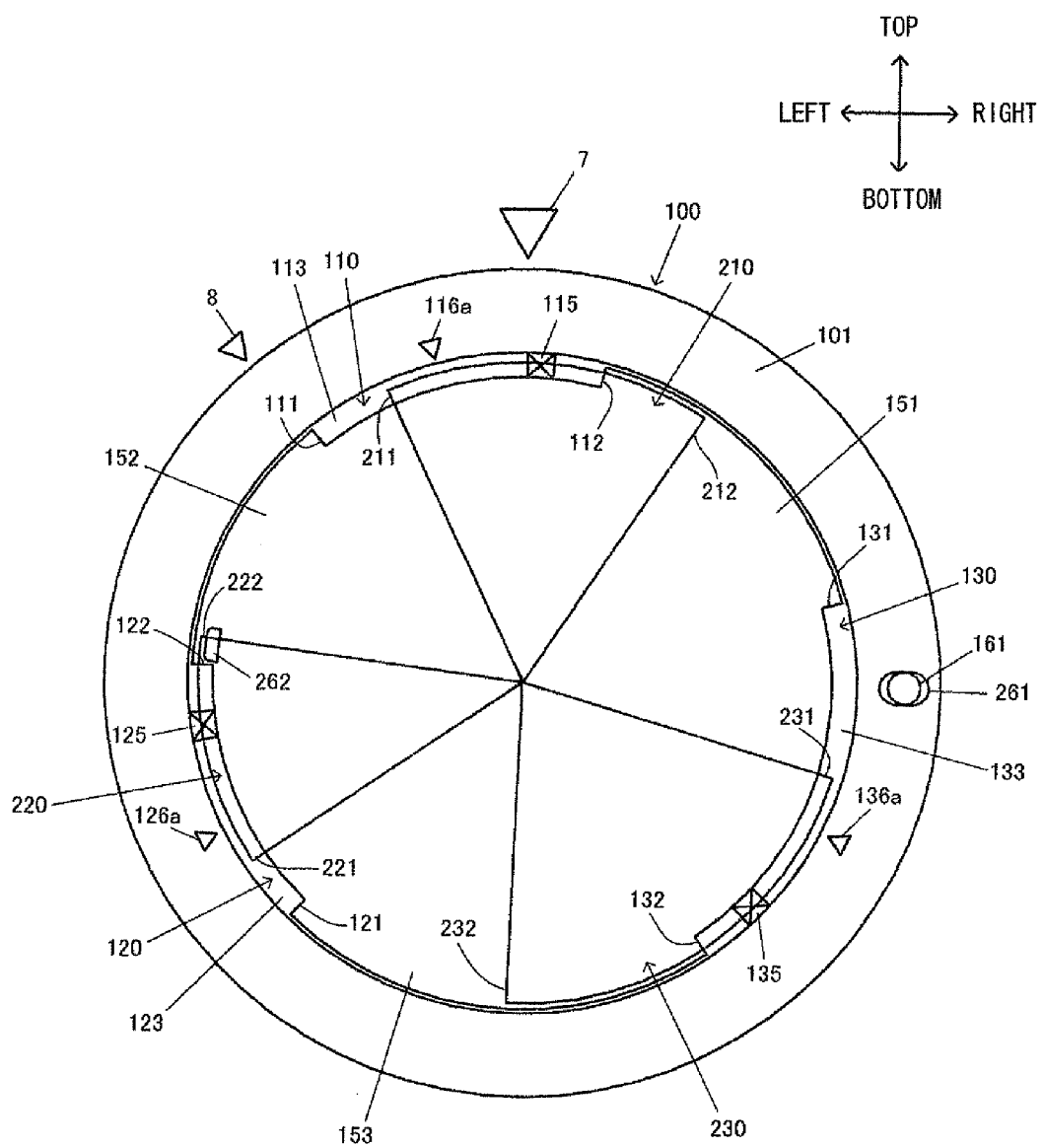
FIG. 8 shows another specific state of interference (state of overlap) between the body-side tabs 110 to 130 and the accessory-side tabs 210 to 230.

A mark assigned with reference numeral 116a in FIG. 8 indicates the position at which the spring 116 presses the front surface 214 of the accessory-side first tab 210, i.e., the specific phase of the spring force pressing position assumed at the body-side first tab 110 along the circumferential direction. Likewise, a mark assigned with reference numeral 126a indicates the specific phase of the position at which the spring 126 presses the front surface 224 of the accessory-side second tab 220 along the circumferential direction, and a mark assigned with reference numeral 136a indicates the specific phase of the position at which the spring 136 presses the front surface 234 of the accessory-side third tab 230 along the circumferential direction.

As indicated in FIGS. 7 and 8, the contact portion 115 is located substantially at the top center of the body mount 100, i.e., at a 12 o'clock angular phase in FIGS. 7 and 8. The contact portion 115 is disposed at a position set apart by a predetermined distance along the circumferential direction from the second side end 112 of the body-side first tab 110. The contact portion 125 of the body-side second tab 120 is disposed at a position set apart along the circumferential direction from the second side end 122 of the body-side second tab 120 by a distance equal to the predetermined distance setting the contact portion 115 apart from the second side end 112 at the body-side first tab 110. The contact portion 135 of the body-side third tab 130 is disposed at a position set apart along the circumferential direction from the second side end 132 of the body-side third tab 130 by a distance equal to the predetermined distance setting the contact portion 115 apart from the second side end 112 at the body-side first tab 110.

FIG. 10 shows a change in the state of engagement between the accessory-side second tab 220 and the body-side second tab 120 occurring in time series as the photographic lens 2 is mounted at the camera body 1 and then is dismounted from the camera body 1 in schematic views of the body-side second tab 120 expanded along the circumferential direction, taken from the outer circumferential side of the photographic lens 2.

Figure 10A:
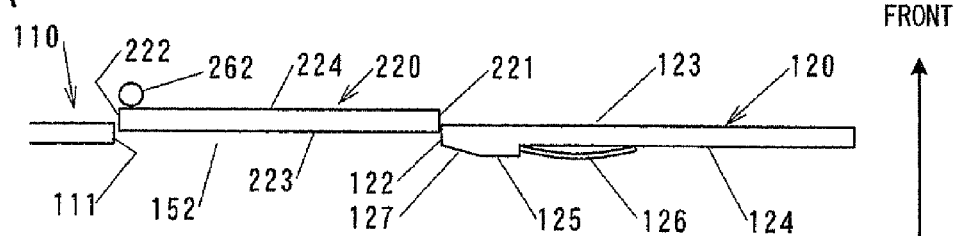
FIGS. 10A-10F illustrate how the state of engagement between the accessory-side second tab 220 and the body-side second tab 120 changes as the photographic lens 2 is mounted and dismounted.
Figure 10B:
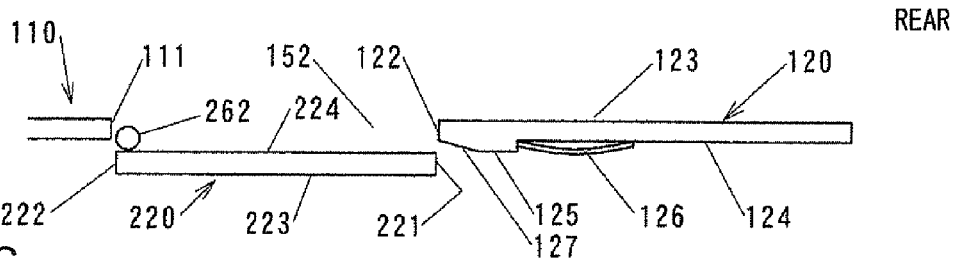

FIG. 10A shows the accessory-side second tab 220 of the accessory mount 200 having been inserted at the correct interlock phase, passing through the body-side second gap 152. FIG. 10B shows the state of the accessory-side second tab 220 and the body-side second tab 120 assumed after the accessory-side second tab 220 passes through the body-side second gap 152 and the accessory-side mount reference surface 201 comes into contact with the body mount reference surface 101.

Figure 10C:
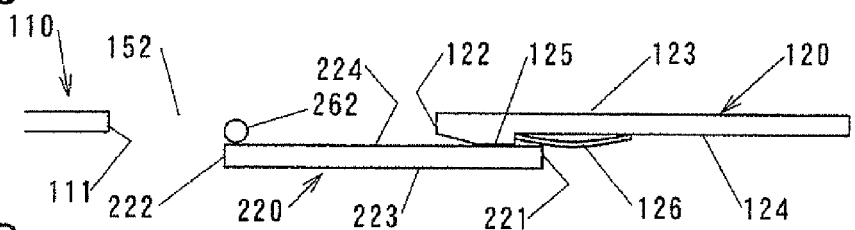
Figure 10D:
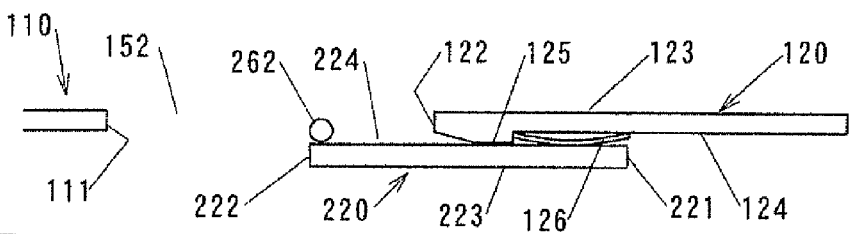

From the state shown in FIG. 10B, the photographic lens 2 is turned along the mounting direction, causing the accessory-side second tab 220 to move into a position to the rear of the body-side second tab 120, as shown in FIG. 10C. The accessory-side second tab 220 further moves to the rear of the spring 126, resulting in an application of a rearward force by the spring 126 to the accessory-side second tab 220, as illustrated in FIG. 10D. Once the photographic lens 2 is turned from the correct interlock phase by an extent matching the mounting angle along the mounting direction, the restricting member 262 comes into contact with the second side end 122 of the body-side second tab 120, as shown in FIG. 10E, thereby preventing further rotation of the photographic lens 2 along the mounting direction.

Figure 10E:
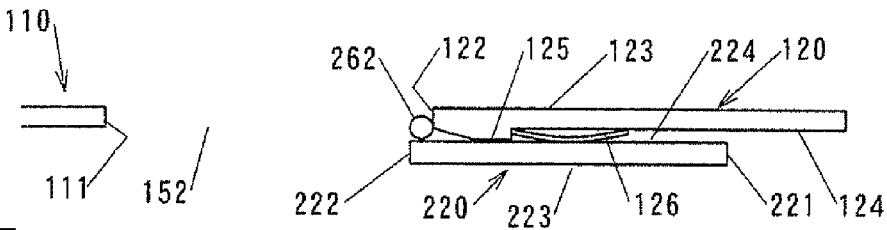
Figure 10F:
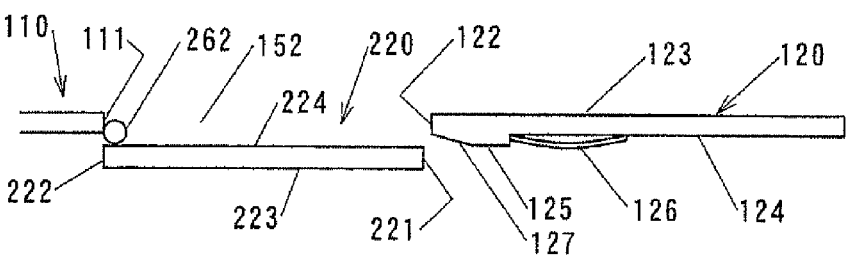

From the state shown in FIG. 10E, the photographic lens 2 is turned along the dismounting direction in order to dismount the photographic lens 2 from the camera body 1. Once the photographic lens 2 is turned along the dismounting direction by an extent matching the mounting angle, the restricting member 262 comes in contact with the first side and 111 of the body-side first tab 110, as illustrated in FIG. 10F, thereby preventing further rotation of the photographic lens 2 along the dismounting direction.

—Insertion of the Photographic Lens 2 at a Phase Other than the Correct Interlock Phase—

If the user attempts to insert the photographic lens 2 at a phase other than the correct interlock phase (hereafter referred to as an incorrect interlock phase), at least two tabs among the body-side tabs 110 to 130 at the body mount 100 and at least two tabs among the accessory-side tabs 210 to 230 at the accessory mount 200 come into contact with each other, i.e., contact is achieved at a total of at least two locations, and thus, insertion of the accessory mount 200 through the body mount 100 is disallowed (deterred) in the embodiment. Namely, the insertion is disallowed in any one of the following conditions.

(1) Insertion is disallowed with contact achieved by the accessory-side tabs 210, 220 and 230 and the body-side tabs 110, 120 and 130 at two contact locations.

(2) Insertion is disallowed with contact achieved by the accessory-side tabs 210, 220 and 230 and the body-side tabs 110, 120 and 130 at three contact locations.

(3) Insertion is disallowed with contact achieved by the accessory-side tabs 210, 220 and 230 and the body-side tabs 110, 120 and 130 at four contact locations.

When insertion is disallowed via two contact locations, damage to an accessory-side tab or a body-side tab or wear of an accessory-side tab or a body-side tab may allow the accessory to be inserted at an incorrect interlock phase. Accordingly, accessory-side tabs and body-side tabs contacting each other at two locations to disallow photographic lens insertion are set to overlap each other over an overlapping angle of 11° in the embodiment. It is to be noted that the overlapping angle of 11° simply represents an example and an optimal angle of overlap should be set by taking into consideration the extent of damage or wear.

The following is a detailed description, given in reference to FIGS. 7 through 15, of the relationship with which the accessory-side tabs 210, 220 and 230 and the body-side tabs 110, 120 and 130 contact each other.

As can be surmised by viewing FIG. 7, if the user attempts to mount the photographic lens 2 slightly offset from the correct interlock phase along the counterclockwise direction in the figure, the rear surface 213 of the accessory-side first tab 210 will come into contact with the front surface 113 of the body-side first tab 110, the rear surface 223 of the accessory-side second tab 220 will come into contact with the front surface 123 of the body-side second tab 120, and the rear surface 233 of the accessory-side third tab 230 will come into contact with the front surface 133 of the body-side third tab 130. In this case, the three body-side tabs 110 to 130 and the three accessory-side tabs 210 to 230 will be in contact with each other and insertion of the accessory mount 200 into the body mount 100 is disallowed. This situation may arise when, for instance, the accessory-side tabs 210 to 230 in FIG. 8 are positioned frontward relative to the body-side tabs 110 to 130.

Figure 11:
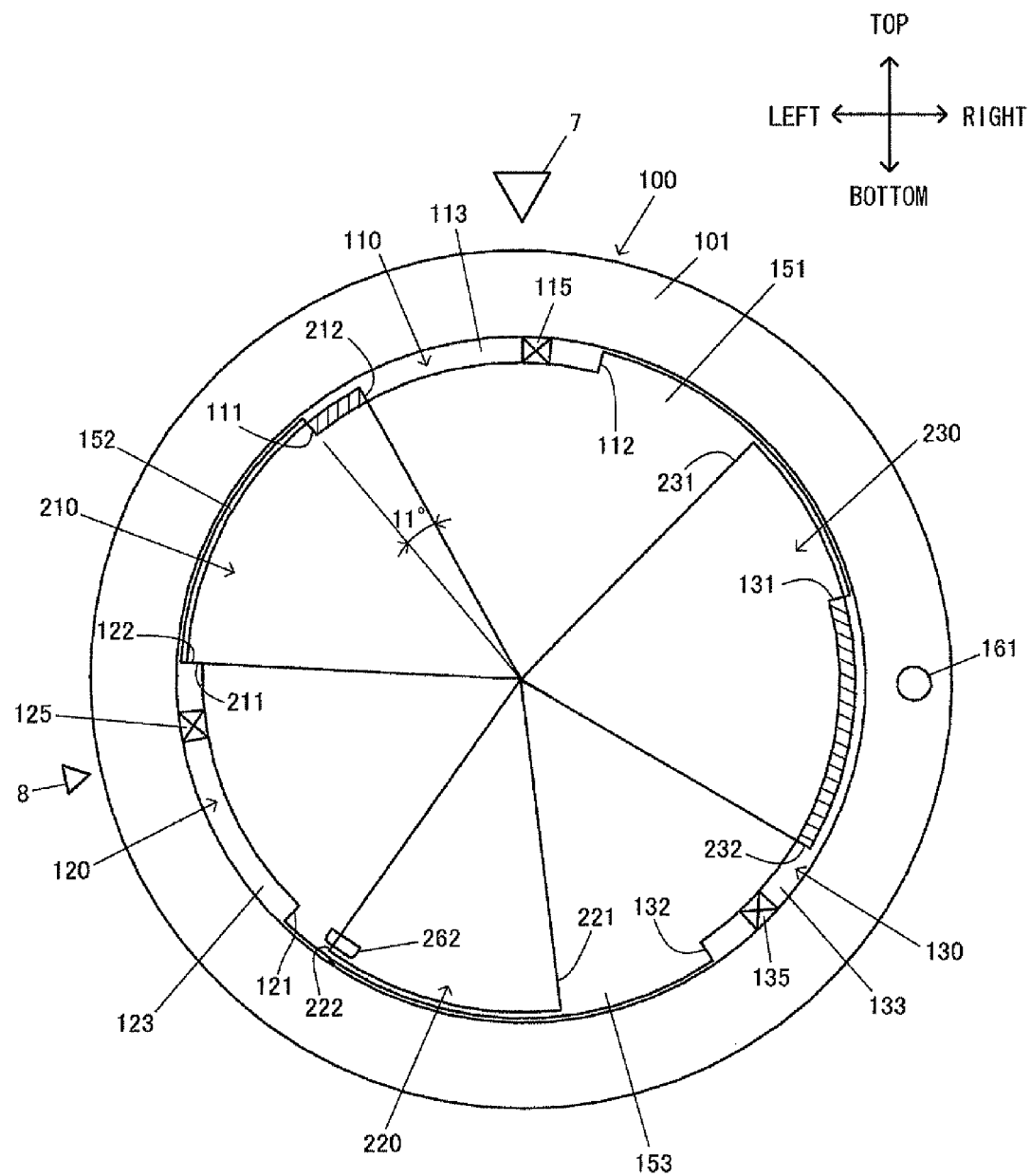
FIG. 11 shows a specific state of interference (state of overlap) between the body-side tabs 110 to 130 and the accessory-side tabs 210 to 230.

If the user attempts to mount the photographic lens 2 offset by a greater extent along the counterclockwise direction relative to the state in FIG. 8 described above, the accessory-side second tab 220 will move frontward relative to the body-side third gap 153, as shown in FIG. 11 and thus, the accessory-side second tab 220 will no longer be in contact with any of the body-side tabs 110 to 130. However, the rear surface 213 of the accessory-side first tab 210 will be contact with the front surface 113 of the body-side first tab 110 and the rear surface 233 of the accessory-side third tab 230 will be contact with the front surface 133 of the body-side third tab 130. In this situation, the contact achieved by the two body-side tabs among the body-side tabs 110 to 130 and the two accessory-side tabs among the accessory-side tabs 210 to 230 disallows insertion of the accessory mount 200 through the body mount 100. Contact thus achieved by the body-side tabs 110 to 130 and the accessory-side tabs at a total of two contact locations, is indicated with the hatched areas in FIG. 11.

A slight counterclockwise rotation of the photographic lens 2 will alter the positional relationship (interlock phase) of the two mounts 100 and 200 relative to each other in FIG. 11 to a positional relationship whereby the rear surface 213 of the accessory-side first tab 210 contacts the front surface 123 of the body-side second tab 120. Namely, a slight counterclockwise turn of the photographic lens 2 will allow the body-side tabs 110 to 130 and the accessory-side tabs 210 to 230 to achieve contact at three contact locations. If, on the other hand, the photographic lens 2 in the state shown in FIG. 11 is turned along the clockwise direction, the rear surface 213 of the accessory-side first tab 210 and the front surface 113 of the body-side first tab 110 will contact each other over a larger area and the rear surface 233 of the accessory-side third tab 230 and the front surface 133 of the body-side third tab 130 will contact each other over a larger area.

In other words, FIG. 11 shows a state in which the contact of the rear surface 213 of the accessory-side first tab 210 and the front surface 113 of the body-side first tab 110 and the contact of the rear surface 233 of the accessory-side third tab 230 and the front surface 133 of the body-side third tab 130 achieved over the smallest contact area, disallow insertion of the lens mount.

The rear surface 213 of the accessory-side first tab 210 and the front surface 113 of the body-side first tab 110 contact each other at the interlock phase shown in FIG. 11 over an angular range, assumed by viewing the body mount 100 from the front side of the camera body 1, of 11°.

As described in detail later, there are other situations in which insertion of the accessory mount 200 through the body mount 100 is disallowed via a total of two contact locations where two tabs among the body-side tabs 110 to 130 and two tabs among the accessory-side tabs 210 to 230 contact each other. Among the plurality of states in which insertion of the accessory mount 200 through the body mount 100 is disallowed via a total of two contact locations where two tabs among the body-side tabs 110 to 130 and two tabs among the accessory-side tabs 210 to 230 achieve contact, the total contact area for the two contact locations is the smallest in two specific conditions, i.e., the state shown in FIG. 11 and the state (not shown) achieved by rotating the photographic lens 2 in the state shown in FIG. 11 by 11° along the counterclockwise direction in the figure, as described below.

If the photographic lens 2 is turned by 11° from the state of the positional relationship of the two mounts 100 and 200 to each other in FIG. 11 along the counterclockwise direction, the contact of the rear surface 213 of the accessory-side first tab 210 and the front surface 113 of the body-side first tab 110 will cease but the rear surface 213 of the accessory-side first tab 210 will come into contact with the front surface 123 of the body-side second tab 120. It is to be noted that contact will also be achieved as the rear surface 233 of the accessory-side third tab 230 comes into contact with the front surface 133 of the body-side third tab 130. The rear surface 213 of the accessory-side first tab 210 and the front surface 123 of the body-side second tab 120 will contact each other over an angular range, assumed by viewing the body mount 100 from the front side of the camera body 1, of 11°, similar to the state shown in FIG. 11.

Thus, in this case too, contact will be achieved by the body-side tabs 110 to 130 and the accessory-side tabs 210 to 230 at a total of two contact locations. Among various states in which insertion of the lens mount is disallowed via the contact achieved by the rear surface 213 of the accessory-side first tab 210 and the front surface 123 of the body-side second tab 120 and the contact achieved by the rear surface 233 of the accessory-side third tab 230 and the front surface 133 of the body-side third tab 130, the accessory-side tabs and the body-side tabs contact each other over the smallest area in this state.

Namely, while there are various insertion disallowed states, in which insertion of the accessory mount 200 through the body mount 100 is disallowed via a total of two contact locations where the rear surface 213 of the accessory-side first tab 210 and the front surface 113 of the body-side first tab 110 are in contact with each other, two tabs among the body-side tabs 110 to 130 and two tabs among the accessory-side tabs 210 to 230 contact each other over the smallest contact areas when the two mounts 100 and 200 assume the positional relationship relative to each other shown in FIG. 11. In addition, the smallest contact area is also assumed in the insertion disallowed state with the photographic lens 2 turned counterclockwise by 11° relative to the state shown in FIG. 11. The interlock phase shown in FIG. 11 and the interlock phase assumed with the photographic lens 2 turned by 11° along the counterclockwise direction relative to the state shown in FIG. 11 are each referred to as a specific interlock phase.

As described above, a counterclockwise rotation of the photographic lens 2 in the state shown in FIG. 11 will cause the rear surface 213 of the accessory-side first tab 210 to come into contact with both the front surface 113 of the body-side first tab 110 and the front surface 123 of the body-side second tab 120 and cause the rear surface 233 of the accessory-side third tab 230 to come into contact with the front surface 133 of the body-side third tab 130. In other words, the body-side tabs 110 to 130 and the accessory-side tabs 210 to 230 will achieve contact at a total of three contact locations.

As the photographic lens 2 is turned further counterclockwise in the figure until the photographic lens 2 is rotated by 11° along the counterclockwise direction relative to the state shown in FIG. 11, as described above, the rear surface 213 of the accessory-side first tab 210 and the front surface 113 of the body-side first tab 110 will cease to be in contact with each other and thus, the number of contact locations where the body-side tabs 110 to 130 and the accessory-side tabs 210 to 230 contact each other will be reduced to two.

Figure 12:
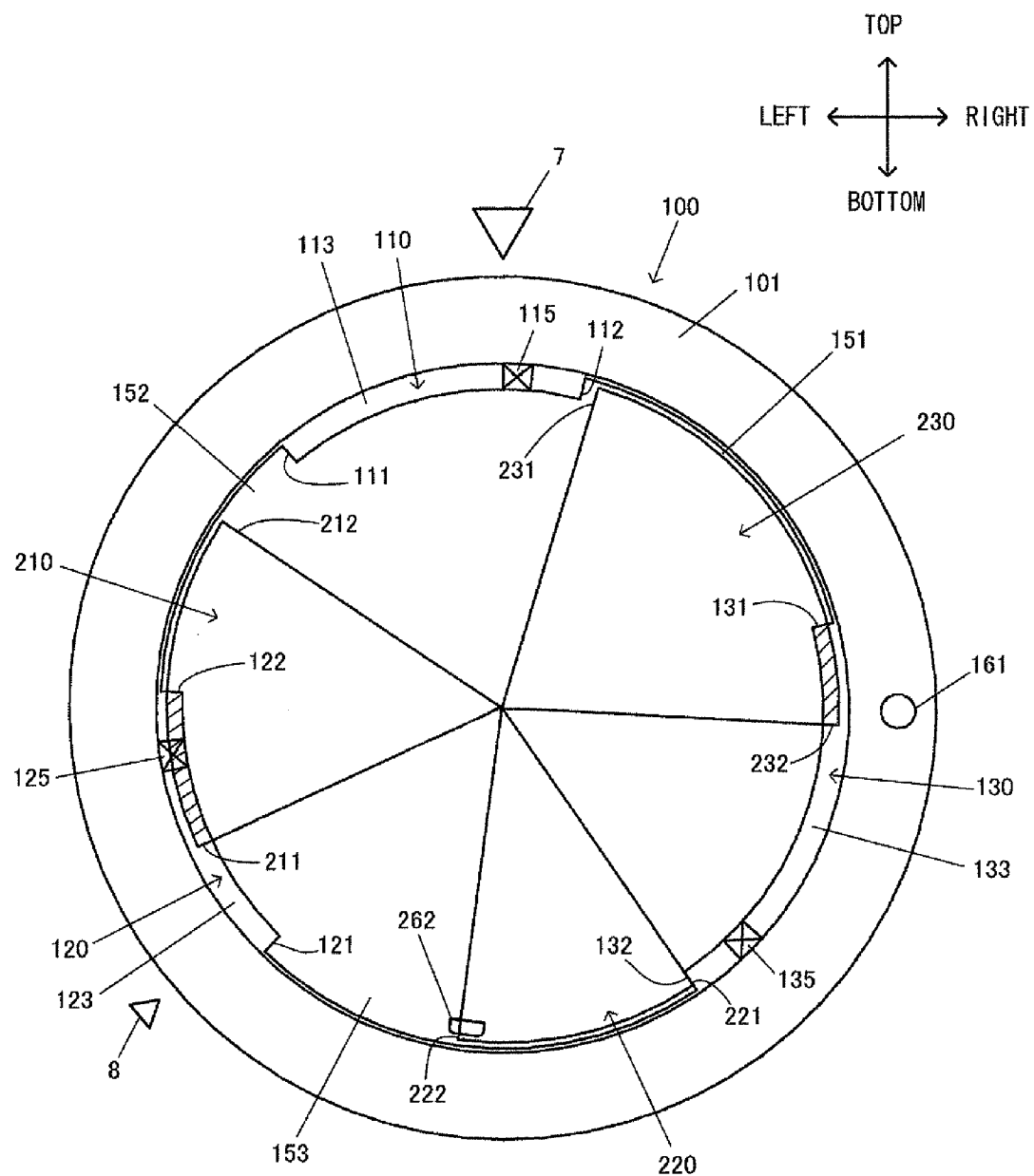
FIG. 12 shows another specific state of interference (state of overlap) between the body-side tabs 110 to 130 and the accessory-side tabs 210 to 230.

As the photographic lens 2 is turned further along the counterclockwise direction in the figure, the state shown in FIG. 12 will be achieved.

As can be surmised by viewing FIG. 12, a slight counterclockwise turn of the photographic lens 2 will alter the positional relationship between two mounts 100 and 200 shown in FIG. 12, causing the rear surface 223 of the accessory-side second tab 220 to come into contact with the front surface 133 of the body-side third tab 130. In other words, contact will be achieved by the body-side tabs 110 to 130 and the accessory-side tabs 210 to 230 at a total of three contact locations. A further counterclockwise turn of the photographic lens 2 will again alter the positional relationship of the two mounts 100 and 200 described above, causing the rear surface 233 of the accessory-side third tab 230 to come into contact with the front surface 113 of the body-side first tab 110 as well. In this situation, contact will be achieved by the body-side tabs 110 to 130 and the accessory-side tabs 210 to 230 over a total of four contact locations.

As the photographic lens 2 is turned further counterclockwise, the rear surface 233 of the accessory-side third tab 230 and the front surface 133 of the body-side third tab 130 will cease contact with each other and then, the rear surface 213 of the accessory-side first tab 210 and the front surface 123 of the body-side second tab 120, too, will cease contact with each other. In other words, contact will be achieved by the body-side tabs 110 to 130 and the accessory-side tabs 210 to 230 at a total of two contact locations under these circumstances, as shown in FIG. 13.

Figure 13:
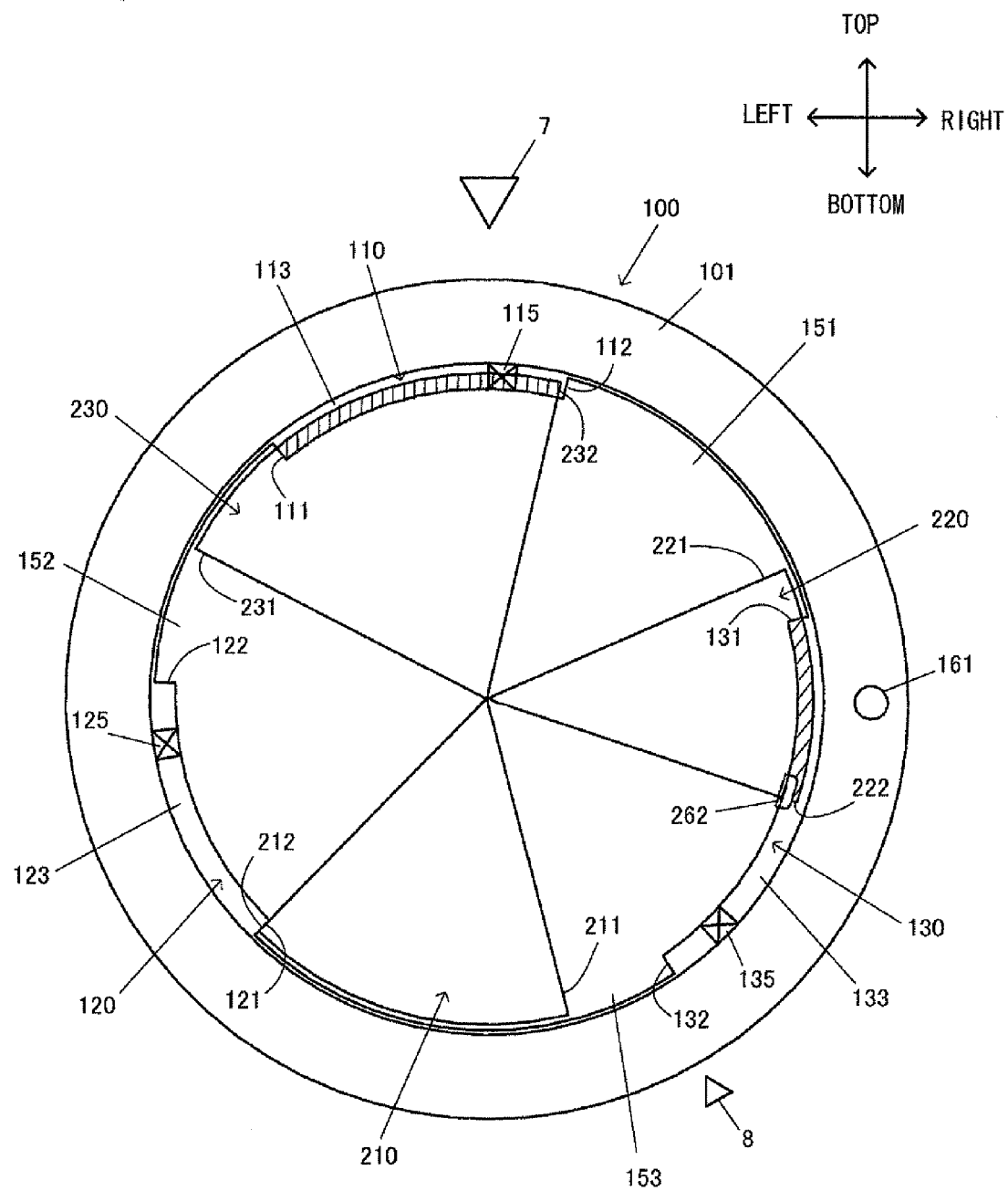
FIG. 13 shows further another specific state of interference (state of overlap) between the body-side tabs 110 to 130 and the accessory-side tabs 210 to 230.

A further counterclockwise turn of the photographic lens 2 will yet again alter the positional relationship of the two mounts relative to each other shown in FIG. 13, causing a decrease in both the contact area over which the rear surface 223 of the accessory-side second tab 220 and the front surface 133 of the body-side third tab 130 are in contact with each other and the contact area over which the rear surface 223 of the accessory-side third tab 230 and the front surface 113 of the body-side first tab 110 are contact with each other. In other words, FIG. 13 shows a state in which the contact is achieved between the rear surface 223 of the accessory-side second tab 220 and the front surface 133 of the body-side third tab 130 and between the rear surface 233 of the accessory-side third tab 230 and the front surface 113 of the body-side first tab 110, over the largest contact area, disallowing insertion of the lens mount 200.

Figure 14:
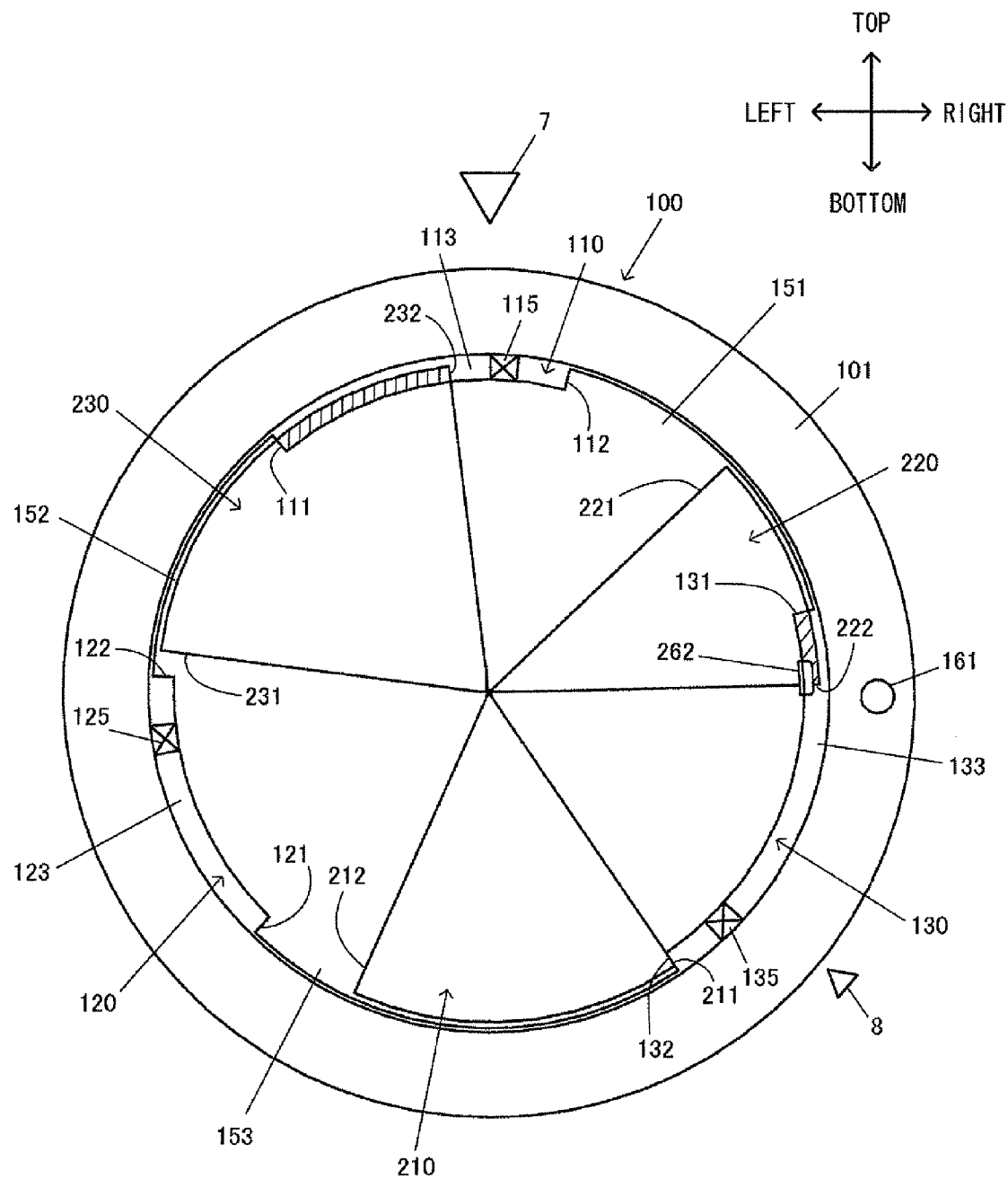
FIG. 14 shows further another specific state of interference (state of overlap) between the body-side tabs 110 to 130 and the accessory-side tabs 210 to 230.

FIG. 14 shows a state achieved by turning the photographic lens 2 along the counterclockwise direction relative to the state shown in FIG. 13. Among various states in which insertion of the lens mount is disallowed via the contact achieved by the rear surface 233 of the accessory-side second tab 220 and the front surface 133 of the body-side third tab 130 and the contact achieved by the rear surface 233 of the accessory-side third tab 230 and the front surface 113 of the body-side first tab 110, the accessory-side tabs and the body-side tabs contact each other over the smallest area in this state. As the figure indicates, the contact area over which a pair of tabs contact each other in this state is greater than the 11° contact area shown in FIG. 11.

Figure 15:
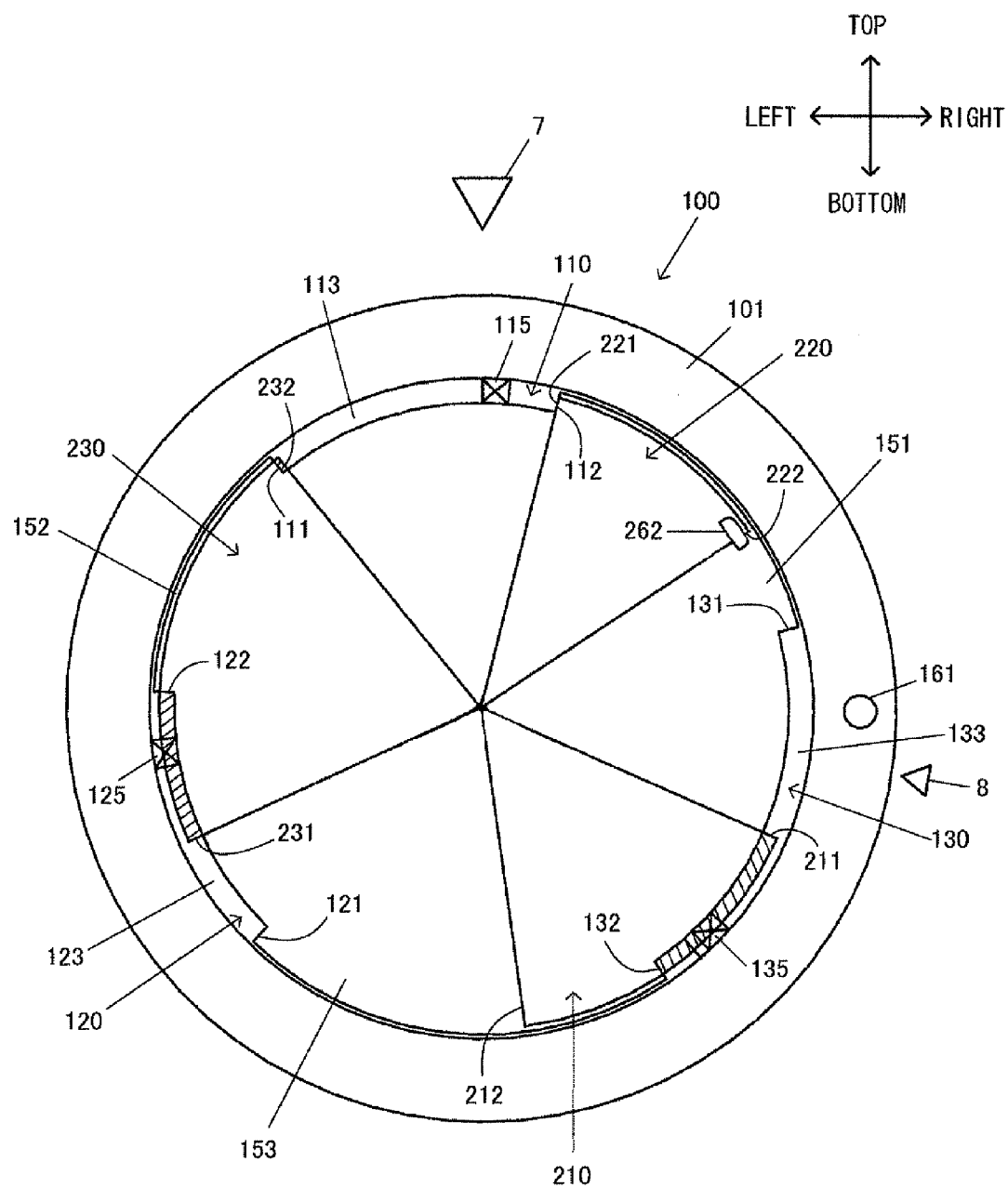
FIG. 15 shows further another specific state of interference (state of overlap) between the body-side tabs 110 to 130 and the accessory-side tabs 210 to 230.

A slight counterclockwise turn of the photographic lens 2 relative to the state shown in FIG. 14 will allow the rear surface 213 of the accessory-side first tab 210 and the front surface 133 of the body-side third tab 130 to come into contact with each other. At this time, contact will be achieved by the body-side tabs 110 to 130 and the accessory-side tabs 210 to 230 at a total of three contact locations. As the photographic lens 2 in this state is turned further along the counterclockwise direction in the figure, the rear surface 233 of the accessory-side third tab 230 and the front surface 123 of the body-side second tab 120 will come into contact with each other. In this state, contact will be achieved by the body-side tabs 110 to 130 and the accessory-side tabs 210 to 230 at a total of four contact locations. As the photographic lens 2 in this state is turned further along the counterclockwise direction in the figure, the rear surface 223 of the accessory-side second tab 220 and the front surface 133 of the body-side third tab 130 will cease contact with each other, as shown in FIG. 15. At this time, contact will be achieved by the body-side tabs 110 to 130 and the accessory-side tabs 210 to 230 at a total of three contact locations.

As the photographic lens is slightly turned along the counterclockwise direction relative to the state shown in FIG. 15, the rear surface 223 of the accessory-side second tab 220 and the front surface 113 of the body-side first tab 110, will come into contact with each other but substantially simultaneously, the contact of the rear surface 233 of the accessory-side third tab 230 and the front surface 113 of the body-side first tab 110 will cease. As the photographic lens 2 is turned further along the counterclockwise direction in the figure, the correct interlock phase shown in FIG. 7 will be reestablished and any contact (interference) between the body-side tabs 110 to 130 and the accessory-side tabs 210 to 230 will cease.

The bayonet structure achieved in the embodiment as described above disallows accessory insertion with contact achieved by the accessory-side tabs and the body-side tabs at least at two contact locations. The smallest angle of overlap with which an accessory-side tab and a body-side tab overlap each other is set to a value greater than that in the related art. More specifically, the smallest angle of overlap is set to 11°. As a result, erroneous insertion of the accessory can be reliably prevented even if the tabs become damaged or worn.

—Accessory-Side Third Tab 230—

When contact is achieved by the body-side tabs 110 to 130 and the accessory-side tabs 210 to 230 at a total of two contact locations with the accessory-side third tab 230 in contact with a body-side tab at one of the contact locations, the accessory-side third tab 230 invariably contacts the body-side tabs 110, 120 or 130 on the side where its second side end 232 is located (i.e., at the rear surface 233 near the second side end 232), rather than on the side where its first side end 231 is located (i.e., at the rear surface 233 near the first side end 231). In other words, when contact is achieved by the body-side tabs 110 to 130 and the accessory-side tabs 210 to 230 at a total of two contact locations and the accessory-side third tab 230 achieves contact at one of the contact locations, the function of preventing erroneous insertion is achieved in the area near the second side end 232 of the accessory-side third tab 230. The accessory-side third tab 230 is formed so that the area near its second side end 232 is positioned in the body-side third gap 153 without overlapping the body-side third tab 130 when the photographic lens 2 is mounted at the camera body 1 as shown in FIG. 8. Namely, when the photographic lens 2 is mounted at the camera body 1, the area near the second side end 232 of the accessory-side third tab 230 does not directly contribute to locking of the photographic lens 2 to the camera body 1.

In addition, as explained earlier, the front surface 234 located near the first side end 231 of the accessory-side third tab 230 is pressed by the spring 136 at the body-side third tab 130, and whenever an excessive external force is applied, the front surface 234 will come into contact with the contact portion 135. This means that when the photographic lens 2 is mounted at the camera body 1, the force applied to lock the photographic lens 2 to the camera body 1 will be applied primarily to the area near the first side end 231 at the accessory-side third tab 230.

In summary, the accessory-side third tab 230 is formed so that different functions are achieved in the area near the first side end 231 and the area near the second side end 232 along the direction in which the accessory-side third tab extends.

—Body-Side First Tab 110—

When contact is achieved by the body-side tabs 110 to 130 and the accessory-side tabs 210, 220 or 230 at a total of two contact locations with the body-side first tab 110 in contact with an accessory-side tab at one of the contact locations, the body-side first tab 110 invariably contacts the accessory-side tabs 210 to 230 on the side where its first side end 111 is located (i.e., at the front surface 113 near the first side end 111), rather than on the side where the second side end 112 is located (i.e., at the front surface 113 near its second side end 112). In other words, when contact is achieved by the body-side tabs 110 to 130 and the accessory-side tabs 210 to 230 at a total of two contact locations and the body-side first tab 110 achieves contact at one of the contact locations, the function of preventing erroneous insertion is achieved in the area near the first side end 111 of the body-side first tab 110.

The spring 116 is disposed adjacent to the contact portion 115 at the body-side first tab 110 over the area near its second side end 112. Namely, the function of locking the photographic lens 2 having been mounted at the camera body 1 is achieved over the area near the second side end 112 of the body-side first tab 110.

In summary, the body-side first tab 110 is formed so that different functions are achieved in the area near the first side end 111 and the area near the second side end 112 along the direction in which the body-side first tab 110 extends.

The camera body 1 and the photographic lens 2 structured as described above achieve the following advantages.

(1) Three accessory-side tabs 210 to 230 assuming a uniform size and disposed over equal intervals and three body-side tabs 110 to 130 assuming a uniform size and disposed over equal intervals will allow the photographic lens 2 to be mounted at the camera body 1 at a phase other than the correct interlock phase. Accordingly, the three accessory-side tabs 210 to 230 are formed in varying sizes and are disposed over varying intervals and the three body-side tabs 110 to 130 are also formed in varying sizes and disposed over varying intervals. In addition, even if the user attempts to insert the photographic lens 2 at a phase other than the correct interlock phase, at least two tabs among the body-side tabs 110 to 130 and at least two tabs among the accessory-side tabs 210 to 230 come into contact with each other at a total of at least two contact locations, to disallow insertion of the accessory mount 200 through the body mount 100. If contact was achieved by a camera accessory mount tab and a camera body mount tab at a single contact location, the other two contact-free tabs on the accessory side could assume positions between camera body-side tabs. In contrast, contact is achieved in the embodiment by the body-side tabs 110 to 130 and the accessory-side tabs 210 to 230 at least at two contact locations at a phase other than the correct interlock phase as described above, and consequently, erroneous mounting of the camera accessory can be reliably prevented.

(2) The restricting member 262, which comes in contact with the second side end 122 of the body-side second tab 120 and the first side end 111 of the body-side first tab 110, restricts the range over which the photographic lens 2 can be turned along the mounting direction and the dismounting direction. Since the rotational range of the photographic lens 2 along the mounting direction and the dismounting direction can be restricted via a single member assuming a simple shape, the manufacturing costs of the body mount 100 and the accessory mount 200 can be minimized.

(3) The restricting member 262 is disposed near a side end of the accessory-side second tab 220 assuming a smallest length along the circumference of the accessory mount 200. At the correct interlock phase, the accessory-side second tab 220 passes through the body-side second gap 152, which extends over an angular range of 47.5° along the circumferential edge of the circular opening of the camera body 1. In addition, the mounting angle assumed in the embodiment is 40.5°. This means that a range over which the restricting member 262 is allowed to move between the second side end 122 of the body-side second tab 120 and the first side end 111 of the body-side first tab 110 within the angular range (47.5° of the body-side second gap 152, is equivalent to the mounting angle. Accordingly, by disposing the restricting member 262 near a side end of the accessory-side second tab 220 assuming the smallest length along the circumference of the accessory mount 200, the mounting angle for the mount system constituted with the body mount 100 and the accessory mount 200 is limited. From a different perspective, the mounting angle setting can be rationalized as described below and the sizes of the body-side second gap 152 and the accessory-side second tab 220 may be regarded to have been set in correspondence to the mounting angle rationalized as described below. In any case, these structural features achieve a rational overall structure with no superfluous structural elements, to contribute toward minimization of overall weight.

It is to be noted that at a smaller mounting angle, t the accessory can be mounted with greater ease, the extent to which electrical contact points (not shown) at the camera body 1 and at the photographic lens 2 slide against each other can be reduced and the extent of wear of the electrical contact points occurring whenever the photographic lens 2 is exchanged can be reduced. However, if the mounting angle is very small, tabs engaged with each other may become inadvertently disengaged from each other, and in such a case, the photographic lens 2 may fall from the camera body. At the same time, the body mount 100 must assume a certain circumferential dimension in order to accommodate the springs 116, 126 and 136, the contact portions 115, 125 and 135 and the tapered surfaces 117, 127 and 137. Moreover, a sufficient mounting angle is required to ensure that the accessory-side tabs 210 to 230 are allowed to reliably engage the springs 116, 126 and 136 and the contact portions 115, 125 and 135 over the tapered surfaces 117, 127 and 137. The mounting angle of 40.5° adopted in the embodiment has been determined by taking into consideration all these factors.

(4) While the weight distribution of the photographic lens 2 is such that the photographic lens 2 tends to pull down on its front side (subject side), the forces applied from the springs 116, 126 and 136 sustain the accessory-side mount reference surface 201 in contact with the body mount reference surface 101 under typical operating conditions. However, if an external force exceeding the force of the springs, working along a direction matching that of gravity is applied to the photographic lens 2 in a photographing state with the camera body 1 in the upright attitude fixed to, for instance, a tripod, the spring 116 of the uppermost body-side first tab 110 will flex further to allow the front surface 214 of the accessory-side first tab 210 to come in contact with the contact portion 115 of the body-side first tab 110.

Figure 16:
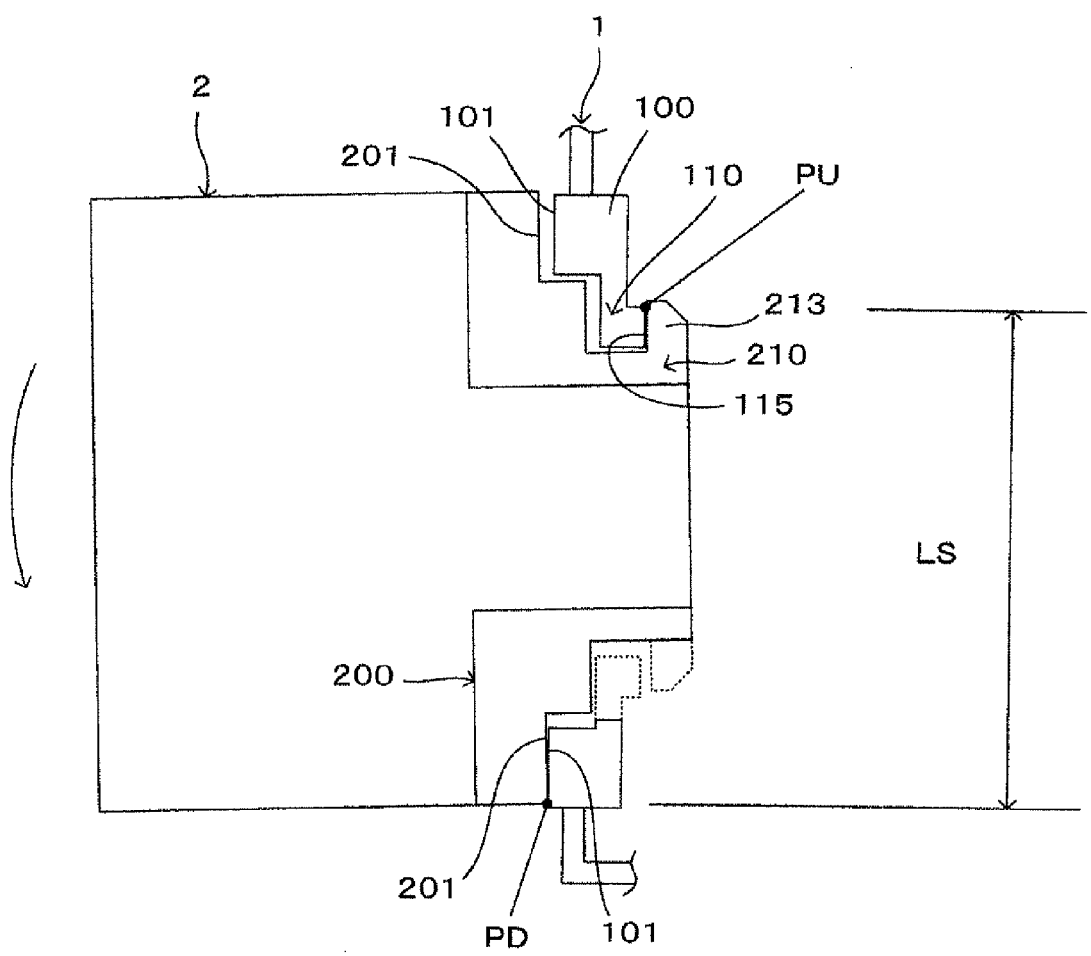
FIG. 16 illustrates the relationship between the body mount 100 and the accessory mount 200 that will manifest if an excessive external force is applied to the photographic lens 2 along the direction matching that of gravitational force.

FIG. 16 illustrates this condition. It is to be noted that the clearances and the like formed between the individual parts are exaggerated in FIG. 16 so as to provide a clear illustration.

In the state shown in FIG. 16, the accessory-side mount reference surface 201 and the body mount reference surface 101 are in contact with each other at a point PD on the lower side, the front surface 214 of the accessory-side first tab 210 and the contact portion 115 of the body-side first tab 110 are in contact with each other at a point PU on the upper side as described above and the weight of the photographic lens 2 and the external force applied to the photographic lens 2 are supported at these two points. Accordingly, the force applied to the two points PD and PU can be reduced by maximizing the vertical distance LS, along the direction of gravitational force, between the two points PD and PU.

This situation will not arise in a normal photographing condition unless an unintended external force is applied. However, the photographic lens 2, which normally assumes a cylindrical shape, tends to come into contact with various objects in real-world usage, may be employed in a range of circumstances. For this reason, a condition shown in FIG. 6 may be expected to arise fairly often and, therefore it is important to devise measures to effectively address the issues arising from such circumstances.

Figure 17:
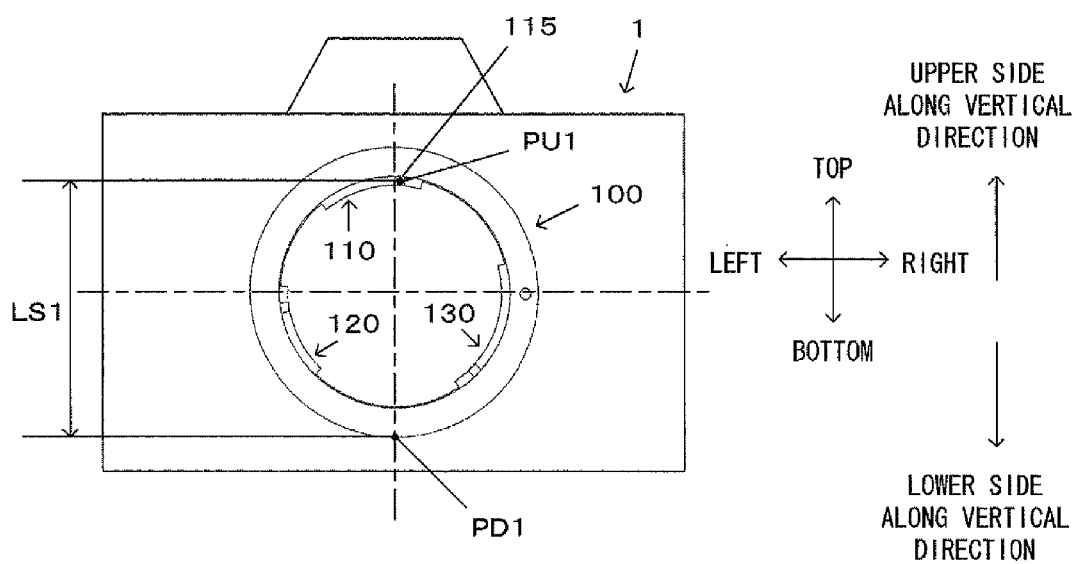
FIG. 17 indicates the contact points PD and PU and the distance LS assumed when the camera body 1 is in a lateral orientation.
Figure 18:
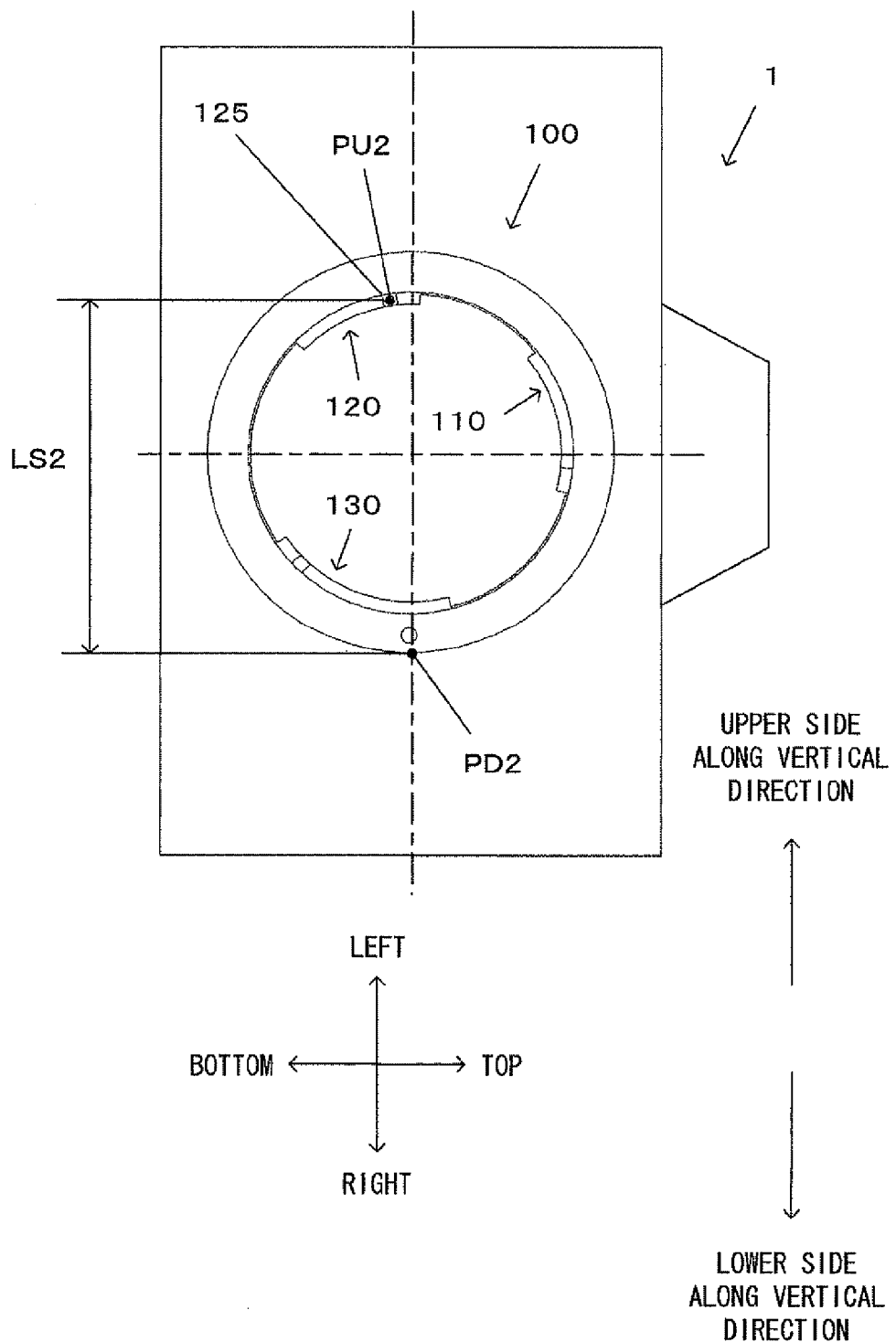
FIG. 18 indicates the contact points PD and PU and the distance LS assumed when the camera body 1 is in a longitudinal orientation.
Figure 19:
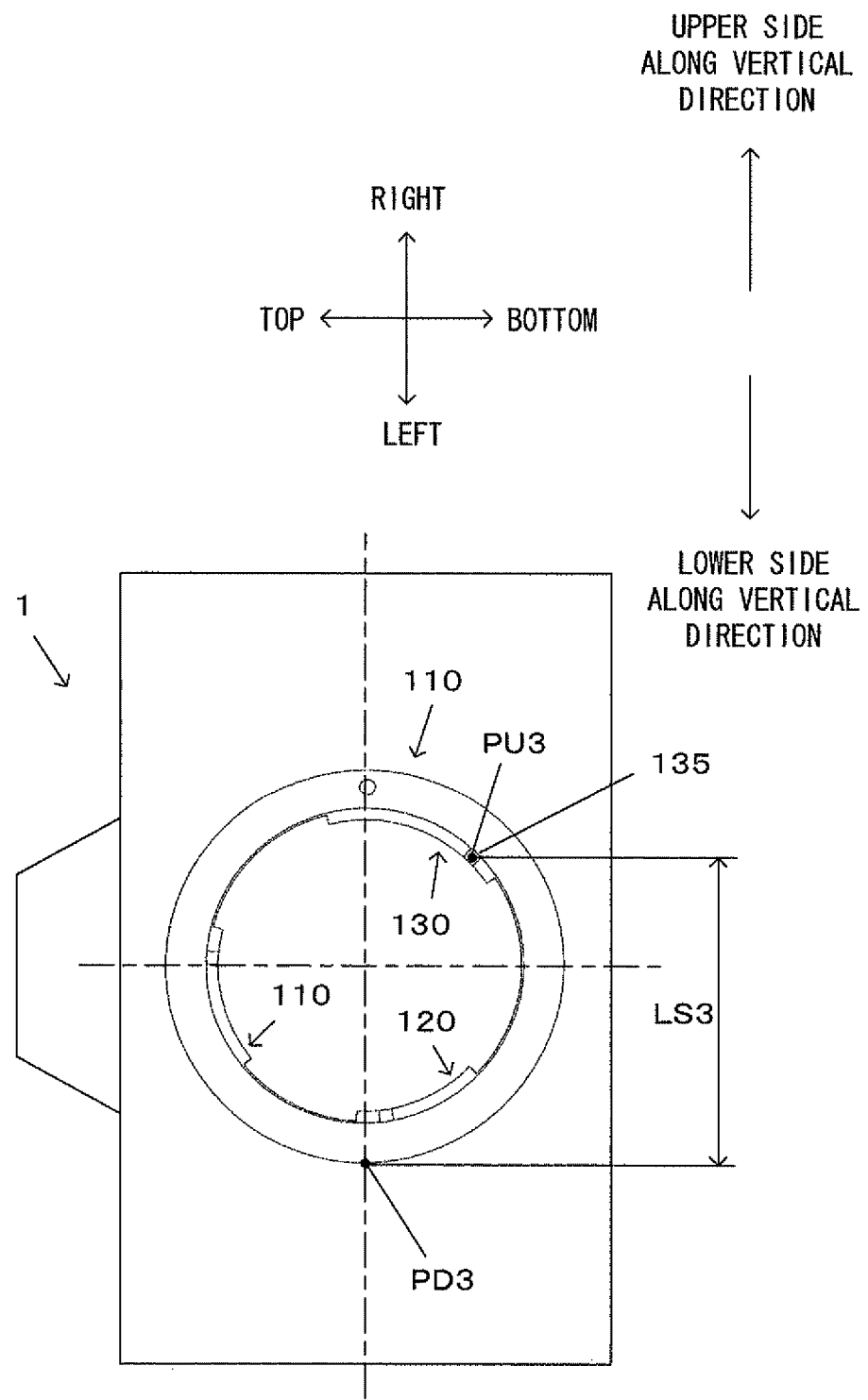
FIG. 19 indicates the contact points PD and PU and the distance LS assumed when the camera body 1 is in another longitudinal orientation.

FIGS. 17 through 19 each indicate the contact points PD and PU and the distance LS corresponding to a specific attitude assumed by the camera body 1. It is to be noted that the camera body 1 assumes the upright attitude (lateral orientation) in FIG. 17, with the distance LS and the contact points PD and PU corresponding to this attitude respectively notated as LS1, PD1 and PU1. The camera body 1 assumes a longitudinal orientation in FIG. 18 achieved by turning the left side of the camera body 1 upward, with the distance LS and the contact points PD and PU corresponding to the upright attitude respectively notated as LS2, PD2 and PU2. The camera body 1 assumes a longitudinal orientation in FIG. 19 achieved by turning the right side of the camera body 1 upward, with the distance LS and the contact points PD and PU corresponding to the particular attitude respectively notated as LS3, PD3 and PU3. The distance LS1 assumed in the lateral orientation in FIG. 17 and the distance LS2 assumed in the longitudinal orientation in FIG. 18 are both substantially equal to the diameter of the body mount 100. However, the distance LS3 in the longitudinal orientation shown in FIG. 19 is markedly smaller than the distances LS1 and LS2.

For this reason, at a given level of external force applied to the photographic lens 2, the level of force working at PU3 will be greater than the levels of force working at PU1 and PU2.

Accordingly, the body-side third tab 130 is formed so as to assume a greater length along the circumferential direction compared to the body-side first tab 110 and the body-side second tab 120 in the embodiment. Greater strength is thus assured for the body-side third tab 130 over the body-side first tab 110 and the body-side second tab 120. In addition, the accessory-side third tab 230 at the accessory mount 200, which is to come into contact with the contact portion 135 (i.e., PU3) when the photographic lens 2 is fully mounted, is formed to achieve a greater length along the circumferential direction than the accessory-side first tab 210 and the accessory-side second tab 220. Consequently, since ample strength is assured at the body-side third tab 130 and the accessory-side third tab 230, the body-side third tab 130 and the accessory-side third tab 230, which are to be subjected to the highest levels of force, will remain intact even when the camera body 1 assumes the longitudinal orientation shown in FIG. 19.

As described above, the advantage of reliably disallowing erroneous insertion at a phase other than the correct interlock phase and the advantage of assuring sufficient strength for the accessory mount 200 and the body mount 100 when the photographic lens 2 having been inserted at the correct interlock phase is fully mounted can both be achieved through the embodiment described above.

(5) As explained earlier, different functions are achieved in the area near the first side end 231 and in the area near the second side end 232 along the direction in which the accessory-side third tab 230 extends. As a result, the durability of the accessory-side third tab 230 is improved. The accessory-side third tab 230, where the application of force at PU3 occurs when the camera body 1 assumes the longitudinal orientation with the right side thereof turned upward, is subjected to the highest level of force. With the durability of this accessory-side third tab 230 coming under the heaviest onus improved as described above, the durability and the reliability of the accessory mount 200 itself are improved.

(6) As explained earlier, different functions are achieved in the area near the first side end 111 and in the area near the second side end 112 along the direction in which the body-side first tab 110 extends. The durability of the body-side first tab 110 is thus improved. The body-side first tab 110, where the spring 116, which, under the weight of the photographic lens 2, is subjected to a more significant and continuous onus compared to the other springs 126 and 136, and the application of force occurs at Pu1 as described earlier when the camera body 1 assumes the typical lateral orientation, is subjected to an onus most frequently. Since the durability of the body-side first tab 110 coming under the most frequent onus is improved, the durability and the reliability of the body mount 100 itself are improved.

(7) The contact portion 115 is set substantially at the top center of the body mount 100 viewed from the front side in the structure achieved in the embodiment and thus, a large value can be set for LS1 mentioned earlier. As a result, the level of force applied at the contact point PU1 can be reduced, which improves the durability of the body-side first tab 110 and effectively prevents the photographic lens 2 from drooping down at its front side. At the same time, the body-side first tab 110 is set at the top center of the body mount 100 viewed from the front side and, as a result, sufficient strength is assured for the contact portion 115. As a result, the durability of the body-side first tab 110 is improved. This ultimately leads to improvements both in the durability and in the reliability of the body mount 100.

(8) As indicated in FIG. 16, the lower areas of the rear surfaces of the body-side tabs 110 to 130 and the lower areas of the front surfaces of the accessory-side tabs 210 to 230 come into contact with each other least readily. This means that there is not a significant need for having the body-side tabs 110 to 130 and the accessory-side tabs 210 to 230 come into contact with each other over these areas. Accordingly, the largest body-side third gap 153 in the embodiment is positioned on the lower side of the body mount 100, as illustrated in FIG. 5. This, in turn, ensures that the body-side tabs 110 to 130 can be positioned in a highly rational configuration.

(9) The following is the rationale for disposing the accessory-side tabs 210 to 230 at the specific positions indicated in FIG. 6. Namely, it is desirable to assure a high degree of strength with a greater length assumed along the circumferential direction at the accessory-side first tab 210, which is positioned at the top center when the photographic lens 2 is mounted at the camera body 1 assuming the lateral orientation. However, since the largest body-side third gap 153 is set on the lower side of the body mount 100, as described earlier, the accessory-side third tab 230, which passes through the body-side third gap 153 when the accessory mount is inserted at the correct interlock phase, is formed to range over the greatest length along the circumferential direction. Accordingly, the accessory-side first tab 210 is formed to range over a second largest length along the circumferential direction. The accessory-side second tab 220, which is not subjected to as many requirements, is formed so as to extend over a smallest range along the circumferential direction. The accessory-side tabs 210 to 230 formed as described above can be disposed with a high level of rationality.

—Variations—

(1) While the accessory-side tabs 210 to 230 are fixed onto the main body of the photographic lens 2 and the photographic lens 2 is mounted or dismounted by turning it along the mounting direction or the dismounting direction relative to the camera body 1 in the embodiment described above, the present invention is not limited to this example. For instance, the present invention may be adopted in conjunction with a structure that includes accessory-side tabs 210 to 230 rotatably disposed relative to the main body of the photographic lens 2 and allows the photographic lens 2 to be mounted at the camera body 1 simply by rotating the accessory-side tabs 210 to 230 alone along the mounting direction once the photographic lens 2 is positioned at the correct interlock phase.

Figure 20:
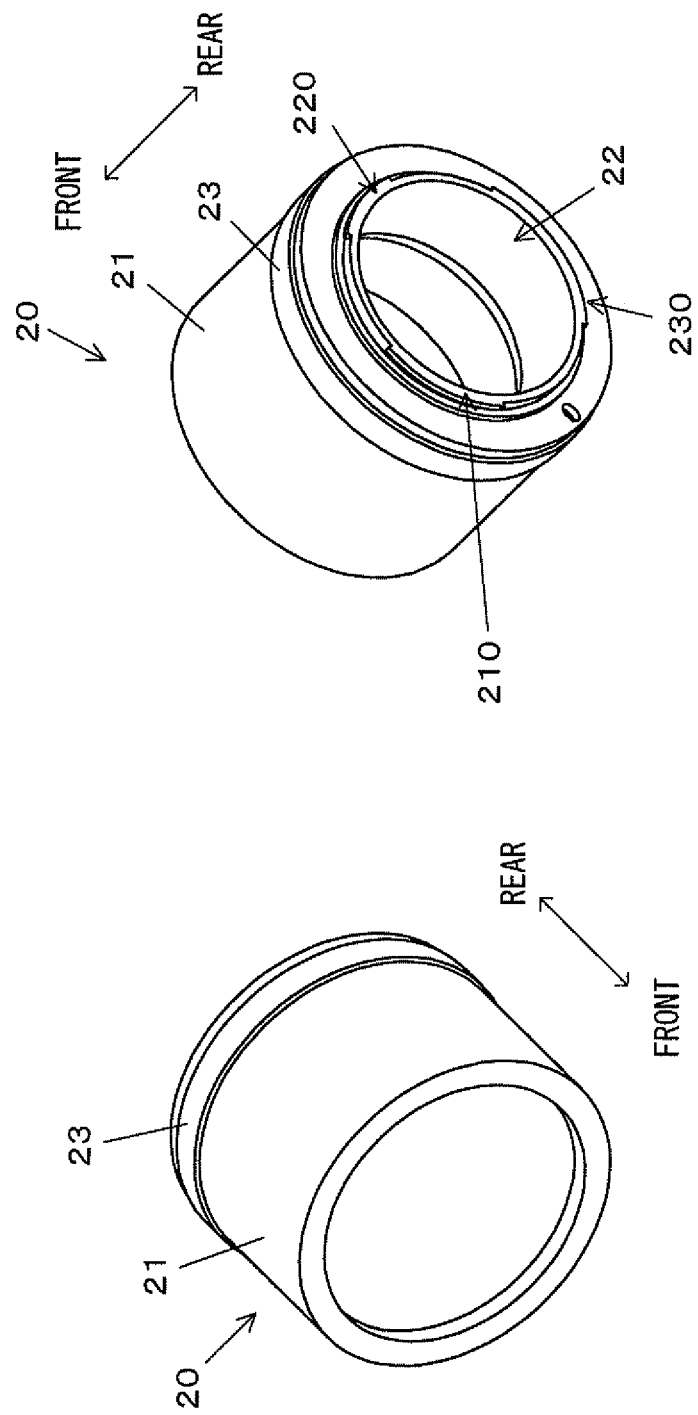
FIG. 20 presents an example of a variation.

FIG. 20 presents external views of a photographic lens 20 with accessory-side tabs 210 to 230 formed thereat so that they are able to rotate relative to the main body of the photographic lens 2. The photographic lens 20 includes a lens barrel 21, a bayonet tube 22 disposed rotatably relative to the lens barrel 21, at which accessory-side tabs 210 to 230 are disposed, and an operation ring 23 via which the bayonet tube 22 is rotated relative to the lens barrel 21. It is to be noted that in FIG. 20 and other figures in reference to which the following description is provided, the same reference numerals are assigned to members similar to those already described so as to preclude the necessity for a repeated explanation thereof.

Figure 21:
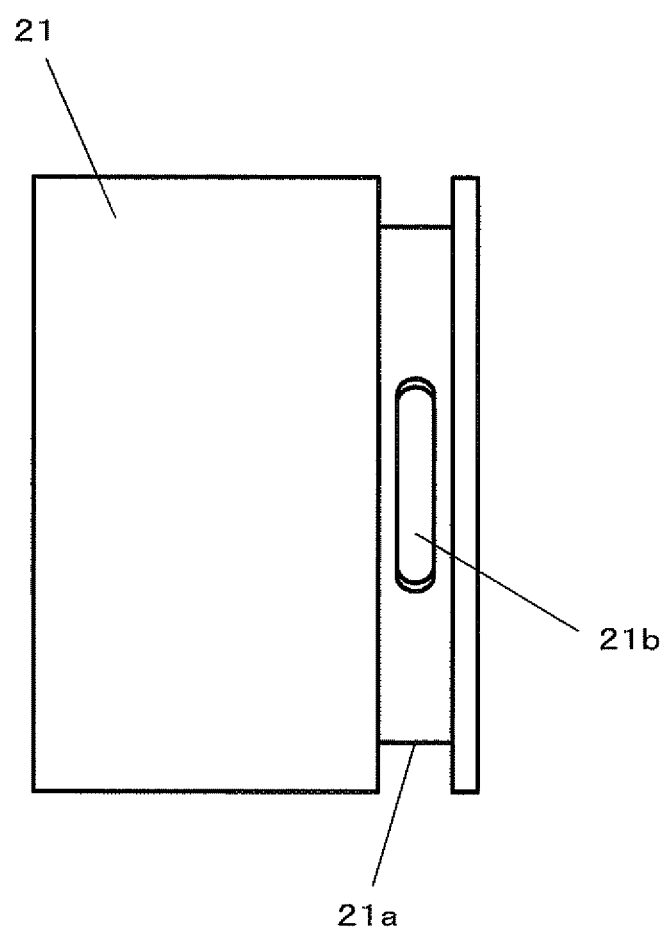
FIG. 21 presents an example of a variation.

FIG. 21 presents an external view of the lens barrel 21, whereas FIG. 22 schematically illustrates the structure of the photographic lens 20. As shown in FIG. 21, a fitting groove 21a at which the operation ring 23 fits is formed at the rear of the lens barrel 21. An elongated hole 21b, through which a pin 24 connecting the operation ring 23 with the bayonet tube 22 is allowed to move, is formed at the bottom of the fitting groove 21a. As indicated in the sectional views presented in FIGS. 22(a) and 22(d), the operation ring 23 fits into the fitting groove 21a at the lens barrel 21 and the operation ring 23 and the bayonet tube 22 are linked with each other via the pin 24. Reference numeral 25 indicates a lens. As the operation ring 23 is rotated relative to the lens barrel 21 in the photographic lens 20 structured as described above, the bayonet tube 22, i.e., the accessory-side tabs 210 to 230, turns together with the operation ring 23 relative to the lens barrel 21. The photographic lens 20 assuming this structure can be mounted at the camera body 1 without having to turn the lens barrel 21, by simply operating the operation ring 23 to turn the bayonet tube 22 alone along the mounting direction once the photographic lens 20 is positioned at the correct interlock phase. It is to be noted that FIG. 22(d) is a sectional view taken along C-C in FIG. 22(a).

(2) The photographic lenses 2 and 20 described above each represent an example of the camera accessory. The present invention is not limited to these examples and may be adopted in conjunction with any of various types of camera accessories such as a converter lens used to adjust the focal length or an adapter used to adjust the distance from the photographic lens mount surface to the image capturing plane, as long as it includes an accessory mount 200, which can be engaged with a body mount 100.

(3) While the restricting member 262 described above is headed pin disposed at the accessory mount 200, an area near the second side end 222, for instance, may be formed in a specific shape so as to function as a restricting member 262, without installing a separate member. Namely, an area near the second side end 222 may be formed to assume a shape that will allow the area to function as a restricting member 262 through injection molding at an accessory mount 200 constituted with a resin injection mold.

(4) The body mount 100 described above may be disposed at the photographic lens 2 and the accessory mount 200 described above may be disposed at the camera body 1.

(5) Various embodiments and variations described above may be adopted in combination.

It is to be noted that the present invention is not limited to specific structural features of the embodiments described above in any way whatsoever and that a camera accessory that can be detachably engaged with a camera body, adopting any of various structures and equipped with an accessory-side mount assuming a bayonet structure with first through third tabs set over intervals along the circumferential direction and projecting from an inner side of the circumference toward the outer side, characterized in that the accessory-side mount is allowed to be inserted through the camera body mount disposed at the camera body without any of the first through third tabs coming into contact with any of three camera body-side tabs at the camera body mount, as long as the accessory-side mount is inserted at the camera body mount at the correct interlock phase, that insertion of the accessory-side mount through the camera body mount is disallowed at a phase other than the correct interlock phase as at least two tabs among the first through third tabs come into contact with at least two of the camera body-side tabs, that the first through third tabs extend along the circumferential direction over varying lengths, with the first tab extending over the greatest length along the circumferential direction, that the first through third tabs include first side ends which are leading ends of the first through third tabs rotated in a mounting direction along the circumferential direction to engage the accessory-side mount inserted at the correct interlock phase with the camera body mount, and second side ends located on a side opposite from the first side ends, and that when the first tab and either the second or third tab come into contact with two of the camera body-side tabs at a total of two contact locations, contact achieved by the first tab is located near its second side end, and an accessory mount adopting any of various structures, which may be included in the camera accessory, are all within the scope of the present invention.

Furthermore, the present invention is not limited to specific structural features of the embodiments described above in any way whatsoever and that a camera accessory that can be detachably engaged with a camera body, adopting any of various structures and equipped with an accessory-side mount assuming a bayonet structure with first through third tabs set over intervals along the circumferential direction and projecting from an inner side of the circumference toward an outer side, characterized in that the accessory-side mount is allowed to be inserted through the camera body mount disposed at the camera body without any of the first through third tabs coming into contact with any of three camera body-side tabs at the camera body mount, as long as the accessory-side mount is inserted at the camera body mount at the correct interlock phase, that insertion of the accessory-side mount through the camera body mount is disallowed at a phase other than the correct interlock phase as at least two tabs among the first through third tabs come into contact with at least two of the camera body-side tabs, that the first tab at the accessory-side mount having been inserted at the correct interlock phase and engaged with the camera body mount overlaps a camera body-side tab assuming the uppermost position when the camera body is set in a longitudinal orientation achieved by rotating the upright camera body assuming a lateral orientation by approximately 90°, that the first through third tabs include first side ends which are leading ends of the first through third tabs rotated in the mounting direction along the circumferential direction to engage the accessory-side mount inserted at the correct interlock phase with the camera body mount and second side ends located on a side opposite from the first side ends and that when the first tab and either the second or third tab come into contact with two of the camera body-side tabs at a total of two contact locations, contact achieved by the first tab is located near its second side end, and an accessory mount adopting any of various structures, which may be included in the camera accessory, are all within the scope of the present invention.

Furthermore, the present invention is not limited in any way whatsoever by the specific details of the embodiment described above and a camera body adopting any of various structures and equipped with a body mount adopting a bayonet structure with first through third tabs, set over intervals along a circumferential edge of a circular opening at the camera body and projecting from an outer side of a circular opening circumference toward an inner side, characterized in that the body mount allows an accessory-side mount disposed at the camera accessory to be inserted thereat without any of the first through third tabs coming into contact with any of three accessory-side tabs at the accessory-side mount, as long as the accessory-side mount is inserted at a correct interlock phase, that insertion of the accessory-side mount is disallowed at a phase other than the correct interlock phase as at least two tabs among the first through third tabs and at least two of the accessory-side tabs come into contact with each other, that the first tab assumes an uppermost position when the camera body is set upright in a lateral orientation, that the first through third tabs include first side ends, which are leading ends in a mounting direction in which the accessory-side tabs are rotated along the circumference of the opening in order to engage the accessory-side mount inserted at the correct interlock phase with the body mount, and second side ends, located on a side opposite from the first side ends, and that when the first tab and either the second or third tab come into contact with two of the accessory-side tabs at a total of two contact locations, a contact area at the first tab includes an area near its first side end, and a body mount adopting any of various structures that may be included in the camera body, are within the scope of the present invention.

The above described embodiments are examples and various modifications can be made without departing from the scope of the invention.

What is claimed is:

1. A camera accessory that can be detachably engaged with a camera body that is equipped with a camera body mount including three camera body-side tabs, the camera accessory comprising an accessory mount assuming a bayonet structure, wherein:
    the camera accessory mount comprises (i) a first tab, a second tab, and a third tab arranged at intervals along a circumferential direction and projecting from an inner side of the accessory toward an outer side, and (ii) a first gap, a second gap, and a third gap arranged at intervals along the circumferential direction;
    the first tab, the second tab and the third tab extend along varying lengths along the circumferential direction;
    the first tab extends over a greatest length along the circumferential direction, and the third tab extends over a shortest length along the circumferential direction;
    the first gap, the second gap, and the third gap extend along varying lengths along the circumferential direction;
    the first gap extends over a greatest length along the circumferential direction, and the third gap extends over a shortest length along the circumferential direction;
    the third gap is arranged between the first tab and the third tab, the first gap is arranged between the first tab and the second tab, and the second gap is arranged between the second tab and the third tab;
    the first tab, the second tab and the third tab include first side ends, which are leading ends of the first tab, the second tab and the third tab rotated in a mounting direction along the circumferential direction in order to engage the accessory mount, inserted at the correct interlock phase with respect to the camera body mount, with the camera body mount, and second side ends located on a side opposite from the first side ends; and
    when the first tab and either the second or third tab mutually come into contact with two of the three of the camera body-side tabs, and there are a total of two contact locations between the camera-body-side tab and the accessory-side tab, the first tab, the second tab, and the third tab are arranged on the accessory mount such that the contact achieved by the first tab is located near the second side end thereof.

2. A camera accessory according to claim 1, wherein:
    the first tab is arranged on the accessory mount such that, when the accessory mount, which has been inserted at the correct interlock phase, is engaged with the camera body mount, the first tab overlaps a camera body-side tab assuming an uppermost position when the camera body is set with a longitudinal orientation achieved by rotating the upright camera body assuming a lateral orientation by approximately 90°.

3. A camera accessory according to claim 2, wherein:
    the first tab, the second tab and the third tab extend along varying lengths along the circumferential direction; and
    the first tab extends over a greatest length along the circumferential direction.

4. A camera accessory according to claim 2, wherein:
    until the accessory mount having been inserted at the correct interlock phase, becomes engaged with the camera body mount with the first tab, the second tab and the third tab rotated in the rotating direction, an area of the first tab where the contact occurs does not overlap the camera body-side tab assuming the uppermost position at the camera body set in the longitudinal orientation.

5. A camera accessory according to claim 1, wherein:
    the first tab, the second tab and the third tab are fixed to a main body of the camera accessory.

6. A camera accessory according to claim 1, wherein:
    the first tab, the second tab and the third tab are rotatably disposed so as to be allowed to rotate along the circumferential direction relative to a main body of the camera accessory.

7. A camera accessory according to claim 1, which further includes:
    a restricting member that restricts a rotational range of the accessory-side tabs along a first rotating direction and along a second rotating direction by coming into contact with a side end of a camera body-side tab when the accessory-side tabs are rotated in the first rotating direction along the circumferential direction in order to engage the accessory mount, having been inserted at the correct interlock phase with the body mount or when the accessory-side tabs are rotated in the second rotating direction along the circumferential direction in order to release the accessory mount from the body mount.

8. A camera accessory according to claim 7 wherein: the restricting member is disposed near a tab extending over a smallest length along the circumferential direction among the first tab, the second tab and the third tab.

9. A camera accessory according to claim 1, wherein: the first tab, the second tab and the third tab are made up with a tab present over an angular range of 56.5° to 115°, a tab present over an angular range of 172.5° to 214.5° and a tab present over an angular range of 267.5° to 343.5° at the accessory mount engaged with the body mount, along a clockwise direction relative to a nine o'clock direction viewed from a rear side of the accessory mount.

10. A camera accessory according to claim 9, wherein: when the first tab, the second tab and the third tab are rotated along the circumferential direction by 40.5° in order to engage the accessory mount having been inserted at the correct interlock phase, with the body mount, the accessory mount becomes engaged with the body mount.

11. An accessory mount disposed at a camera accessory according to claim 1.

12. A camera accessory according to claim 1, wherein: the body mount adopting a bayonet structure with a first tab, a second tab and a third tab disposed over intervals along a circumferential edge of a circular opening at the camera body and projecting from an outer side of the opening toward an inner side, wherein:
the body mount is structured so that insertion of an accessory mount disposed at the camera accessory is allowed as long as the accessory mount is inserted at a correct interlock phase without any of the first tab, the second tab and the third tab coming into contact with any of three accessory-side tabs at the accessory mount, and insertion of the accessory mount is disallowed at a phase other than the correct interlock phase as at least two tabs among the first tab, the second tab and the third tab come into contact with at least two of the accessory-side tabs;
the first tab assumes an uppermost position when the camera body is set upright in a lateral orientation;
the first tab, the second tab and the third tab include first side ends, which are leading ends in a mounting direction in which the accessory-side tabs are rotated along the circumference of the opening in order to engage the accessory-side mount inserted at the correct interlock phase with the body mount and second side ends, located on a side opposite from the first side ends;
when the first tab and either the second or third tab come into contact with two of the accessory-side tabs at a total of two contact locations, a contact area at the first tab includes an area near the first side end thereof; and
when the camera accessory mount is positioned at the correct interlock phase relative to the body mount disposed at the camera body insertion through the camera body mount is allowed without any of the first tab, the second tab and the third tab of the accessory-side tabs coming into contact with any of three camera body-side tabs at the camera body mount; and
at a phase other than the correct interlock phase, insertion through the camera body mount is disallowed with at least two tabs among the first tab, the second tab and the third tab of the accessory-side tabs coming into contact with at least two of the camera body-side tabs.

13. A camera accessory mount disposed at a camera accessory according to claim 12.

14. A camera body with which a camera accessory comprising an accessory mount including three accessory-side tabs can be detachably engaged, the camera body comprising a body mount adopting a bayonet structure, wherein:
the body mount includes a first tab, a second tab, and a third tab arranged at intervals along a circumferential direction and projecting from an inner side of the camera body toward an outer side, and
a first gap, a second gap, and a third gap arranged at intervals along the circumferential direction, wherein
the first tab, the second tab, and the third tab extend along varying lengths along the circumferential direction;
the third tab extends over a greatest length along the circumferential direction, and the second tab extends over a shortest length along the circumferential direction;
the first gap, the second gap, and the third gap extend along varying lengths along the circumferential direction the third gap extends over a greatest length along the circumferential direction, and the second gap extends over a shortest length along the circumferential direction;
the third gap is arranged between the second tab and the third tab, the first gap is arranged between the first tab and the third tab, and the second gap is arranged between the second tab and the first tab;
the first tab assumes an uppermost position when the camera body is set upright in a lateral orientation;
the first tab, the second tab and the third tab include first side ends, which are leading ends in a mounting direction in which the accessory-side tabs are rotated along the circumference of the opening in order to engage the accessory-side mount inserted at the correct interlock phase with respect to the body mount, with the body mount, and second side ends, located on a side opposite from the first side ends; and
when the first tab and either the second or third tab come into contact with two of the accessory-side tabs, and there are a total of two contact locations between the body-side tabs and the accessory-side-tabs, the first tab, the second tab, and the third tab are arranged on the body mount such that a contact area at the first tab includes an area near the first side end thereof.

15. A camera body according to claim 14, wherein:
the opening is formed in a front side of the camera body; and
the first tab extends along the circumference of the opening with a part thereof passing through a point at a top center of the opening when the camera body assumes the lateral orientation.

16. A camera body according to claim 15, which further includes:
elastic members that individually apply force to the accessory-side tabs over ranges extending between the accessory-side tabs and the first through third tabs, toward a rear surface of the camera body when the accessory-side tabs are rotated along the circumference of the opening in order to engage the accessory mount inserted at the correct interlock phase with the body mount; and
the first tab, the second tab and the third tab include restricting portions that restrict movement of the accessory-side tabs by coming into contact with the accessory-side tabs having moved toward a front side of the camera body against the force applied by the elastic members.

17. A camera body according to claim 16, wherein:
a restricting portion included in the first tab assumes a position directly above a center of the opening along a vertical direction when the camera body is set in the lateral orientation.

18. A camera body according to claim 15, wherein:
the first tab, the second tab and the third tab extend over varying lengths along the circumference of the opening; and
the intervals each present between two consecutive tabs among the first tab, the second tab and the third tab, an interval between two tabs occupying positions on two sides of a point set at a bottom center of the opening when the camera body assumes the lateral orientation, is largest.

19. A camera body according to claim 15, wherein:
the first tab, the second tab and the third tab are made up with a tab present over an angular range of 76° to 130°, a tab present over an angular range of 177.5° to 226° and a tab present over an angular range of 304.5° to 15° (375°) along a counterclockwise direction relative to a three o'clock direction when the opening at the camera body assuming the lateral orientation is viewed from a front side.

20. A camera body according to claim 19, wherein:
when the accessory-side tabs are rotated along the circumference of the opening by 40.5° in order to engage the accessory mount, having been inserted at the correct interlock phase, with the body mount, the accessory mount becomes engaged with the body mount.

21. A camera body according to claim 14, wherein:
the camera body is equipped with an accessory mount assuming a bayonet structure with a first tab, a second tab and a third tab set over intervals along a circumferential direction and projecting from an inner side of the accessory toward an outer side, wherein:
the camera accessory mount is structured so that insertion of the accessory mount through the camera body mount disposed at the camera body is allowed as long as the accessory mount is inserted at a correct interlock phase relative to the camera body mount without any of the first tab, the second tab and the third tab coming into contact with any of three camera body-side tabs at the camera body mount, and that insertion of the accessory mount through the camera body mount is disallowed if the accessory mount is positioned at a phase other than the correct interlock phase with at least two tabs among the first tab, the second tab and the third tab coming into contact with at least two of the camera body-side tabs;
the first tab, the second tab and the third tab extend along varying lengths along the circumferential direction;
the first tab extends over a greatest length along the circumferential direction;
the first tab, the second tab and the third tab include first side ends, which are leading ends of the first tab, the second tab and the third tab rotated in a mounting direction along the circumferential direction to engage the accessory mount inserted at the correct interlock phase with the camera body mount, and second side ends located on a side opposite from the first side ends;
when the first tab and either the second or third tab comes into contact with two of the camera body-side tabs at a total of two contact locations, contact achieved by the first tab is located near the second side end thereof; and
when the accessory mount is positioned at the correct interlock phase, the body mount allows insertion of the accessory mount without any of the first tab, the second tab and the third tab of the camera body-side tabs coming into contact with any of three accessory-side tabs at the accessory mount, and disallows insertion of the accessory mount at a phase other than the correct interlock phase with at least two of the first tab, the second tab and the third tab of the camera body-side tabs coming into contact with at least two of the accessory-side tabs.

22. A body mount disposed at the camera body according to claim 14.

* * * * *